US012603984B2

(12) United States Patent
Liu et al.

(10) Patent No.: US 12,603,984 B2
(45) Date of Patent: Apr. 14, 2026

(54) DENSE-VIEWPOINT THREE-DIMENSIONAL DISPLAY SYSTEM WITH DISCRETELY—ARRANGED EYEBOXES AND DISPLAY METHOD THEREOF

(71) Applicant: ZhuJing (Guangzhou) Technology Co., Ltd., Guangdong (CN)

(72) Inventors: Lilin Liu, Guangdong (CN); Dongdong Teng, Guangdong (CN)

(73) Assignee: ZhuJing (Guangzhou) Technology Co., Ltd., Guangdong (CN)

( * ) Notice: Subject to any disclaimer, the term of this patent is extended or adjusted under 35 U.S.C. 154(b) by 0 days.

(21) Appl. No.: 18/931,088

(22) Filed: Oct. 30, 2024

(65) Prior Publication Data

US 2025/0142043 A1     May 1, 2025

(30) Foreign Application Priority Data

Oct. 31, 2023    (CN) .......................... 202311441074.4
May 16, 2024    (CN) .......................... 202410611327.6
Jun. 21, 2024    (CN) .......................... 202410811366.0

(51) Int. Cl.

| | |
|---|---|
| *H04N 13/32* | (2018.01) |
| *G02B 27/00* | (2006.01) |
| *G02B 27/01* | (2006.01) |
| *G02B 30/29* | (2020.01) |
| *G02B 30/33* | (2020.01) |

(Continued)

(52) U.S. Cl.

CPC ......... *H04N 13/32* (2018.05); *G02B 27/0093* (2013.01); *G02B 27/0101* (2013.01); *G02B 30/29* (2020.01); *G02B 30/33* (2020.01);

*H04N 13/324* (2018.05); *H04N 13/383* (2018.05); *H04N 13/385* (2018.05); *H04N 13/398* (2018.05); *G02B 2027/0134* (2013.01)

(58) Field of Classification Search
CPC .... H04N 13/32; H04N 13/385; H04N 13/383; H04N 13/324; H04N 13/398; G02B 30/29; G02B 30/33; G02B 27/0093; G02B 27/0101; G02B 2027/0134
USPC ...................................................... 348/42, 57
See application file for complete search history.

(56) References Cited

U.S. PATENT DOCUMENTS

| | | | | | |
|---|---|---|---|---|---|
| 2011/0317261 A1* | 12/2011 | Minami | ............... | G02B 5/0215 | |
| | | | | | 359/462 |
| 2013/0114007 A1* | 5/2013 | Lin | ........................ | H04N 13/31 | |
| | | | | | 349/15 |

(Continued)

*Primary Examiner* — Thai Q Tran
(74) *Attorney, Agent, or Firm* — JCIPRNET

(57) ABSTRACT

Present disclosure discloses a dense-viewpoint three-dimensional display system and display method thereof, which uses the smallest surface structure that can emit light independently as a display cell. A light-guiding element of an eyebox-generating device guides beams from corresponding display cells to discretely arranged eyeboxes with dense viewpoints. In present disclosure, a display cell projects a beam along a special projecting path to the corresponding viewpoint. Relative to traditional 3D display which takes a pixel as a display unit and lets all sub-pixels of a pixel correspond to a common projecting path, present disclosure can effectively increase the reachable viewpoint number. Furthermore, configuring discretely distributed eyeboxes to keep tracking a viewer's pupils also can reduce necessary viewpoint number for implementing a VAC-free 3D display.

18 Claims, 25 Drawing Sheets

(51) Int. Cl.

| | | |
|---|---|---|
| *H04N 13/324* | (2018.01) | |
| *H04N 13/383* | (2018.01) | |
| *H04N 13/385* | (2018.01) | |
| *H04N 13/398* | (2018.01) | |

(56) References Cited

U.S. PATENT DOCUMENTS

| | | | | |
|---|---|---|---|---|
| 2013/0155503 A1* | 6/2013 | Yen | ..................... | H04N 13/305 |
| | | | | 359/463 |
| 2016/0291336 A1* | 10/2016 | Yoshida | ............... | H04N 13/324 |
| 2020/0018983 A1* | 1/2020 | Wu | .......................... | G02F 1/29 |
| 2021/0223462 A1* | 7/2021 | Liu | ................... | G02B 27/1006 |
| 2021/0314553 A1* | 10/2021 | Teng | ................... | H04N 13/307 |
| 2023/0408826 A1* | 12/2023 | Oh | ........................ | G02F 1/1368 |

* cited by examiner

DENSE-VIEWPOINT THREE-DIMENSIONAL DISPLAY SYSTEM WITH DISCRETELY—ARRANGED EYEBOXES AND DISPLAY METHOD THEREOF

CROSS REFERENCE TO RELATED APPLICATION

This application claims the priority benefit of China patent application serial no. 202311441074.4 filed Oct. 31, 2023, China patent application serial no. 202410611327.6 filed May 16, 2024, and China patent application serial no. 202410811366.0 filed Jun. 21, 2024. The entirety of each of the above-mentioned patent applications is hereby incorporated by reference herein and made a part of the specification.

TECHNICAL FIELD

Present disclosure relates to the field of three-dimensional (3D) display technology, and more specifically to a dense-viewpoint 3D display system and display method thereof. Define a smallest surface structure of the display screen as a display cell, for increasing number of viewpoints. Discretely arranged eyeboxes are also presented, which decreases the necessary viewpoint number for implementing VAC-free SMV display.

BACKGROUND

Compared to two-dimensional (2D) display, 3D display is receiving more attentions, due to its ability of presenting depth information. Conventional multi-view 3D display often gets implemented by attaching a light-guiding grating to a display screen, with beams from different pixels being guided to different viewpoints. Due to limited resolution of available display screens, the interval between adjacent viewpoints is often set larger than pupil's diameter, for providing a not too small observing region. Thus, each pupil will perceive one corresponding 2D image, and a 3D display gets implemented by only binocular parallax, which is called a stereoscopic display. However, in a stereoscopic display, the binocular convergence depth (at displayed 3D scene) isn't equal to the monocular focusing depth (at the display screen or its image plane), which is called as Vergence-Accommodation Conflict (VAC). Such VAC is the main cause of viewing fatigue. Dense viewpoints with an interval smaller than pupil's diameter is crucial for a VAC-free 3D display, which is also called as Super Multi-view (SMV) display. When said dense viewpoints can cover both pupils of a viewer, for a display point, at least two passing-through beams will be perceived by each pupil. Relative to a pixel on the display screen or its image, when superimposed light distribution of the at least two passing-through beams at a display point is more attractive to the pupil's focus, the viewer's focus will be dragged to the display point, kicking the VAC problem off.

But dense viewpoints covering both eyes of a viewer will require a great number of viewpoints. For example, for a pupil diameter $D_p$ of 3 mm, 120/1.5=80 viewpoints are necessary for covering an observing region 120 mm at a viewpoint-interval of 1.5 mm. A great number of viewpoints will result in a low display resolution, which is equal to a ratio between resolution of the display screen and the viewpoint number. So, presenting more viewpoints and decreasing the necessary viewpoint number are two key paths for implementing a VAC-free SMV 3D display.

SUMMARY OF THE INVENTION

Present disclosure proposes a dense-viewpoint 3D display system and the display method thereof. A display cell, represented by a surface arranged sub-pixel of a conventional display screen, is configured to have a special projecting path in present disclosure. Relative to conventional 3D display, where sub-pixels of a pixel correspond to a common projecting path, present design of display cell is beneficial for presenting more viewpoints. Meanwhile, discretely arranged eyeboxes are beneficial for gathering generated viewpoints to regions just around the viewer's pupils, which can decrease the necessary viewpoint number for implementing a VAC-free SMV display (or increase the utilization efficiency of the generated viewpoints).

Present disclosure provides the following solution:

A dense-viewpoint three-dimensional display system comprising:

a display screen comprising a plurality of display cells for projecting light to two pupils of a viewer, wherein all display cells are divided into multiple display-cell blocks along at least one direction;

wherein, the display cell is a smallest surface structure which is capable of emitting light independently;

an eyebox-generating device comprising a plurality of light-guiding elements arranged along at least one direction, wherein the light-guiding element is used for guiding beams or reverse extension lines of the beams from $N_b$ corresponding display-cell blocks to $N_b$ relay-eyeboxes in a one-to-one manner, $N_b$ is an integer and $N_b \geq 2$;

wherein, for any one of the light-guiding elements, the $N_b$ display-cell blocks corresponding to the light-guiding element are spaced by $n \times N_b$ display-cell blocks along at least one direction, n is an integer and $n \geq 0$;

a projecting unit (50) capable of imaging said $N_b$ relay-eyeboxes to $N_b$ active-eyeboxes, respectively;

a control unit (30) capable of refreshing a display cell with projection information of a to-be-displayed scene along corresponding projecting path;

wherein, a projecting path corresponding to the display cell is the propagation path of a beam which comes from the display cell and incidents into corresponding relay-eyebox, or corresponding active-eyebox, and different display cells correspond to different projecting paths;

a tracking unit (40) capable of detecting positions of the viewer's pupils under control of said control unit (30);

wherein, said dense-viewpoint three-dimensional display system is configured such that, along at least one direction, beams from display-cell blocks spaced by $(N_b-1)$ display-cell blocks are guided to a same relay-eyebox at a time-point;

and, for a displayed point, a pupil in the relay-eyebox or the active-eyebox can perceive more than one beams passing through the displayed point when all display cells are activated.

Preferably, the eyebox-generating device is a one-dimensional lenticular grating comprising a plurality of lenticular lens functioning as the light-guiding elements, or a one-dimensional slit grating comprising a plurality of slits functioning as light-guiding elements, or a two-dimensional lens grating comprising a plurality of lenticular lens functioning as the light-guiding elements, or a two-dimensional aperture grating comprising a plurality of apertures functioning as the light-guiding elements, or a two-dimensional micro-nano component array comprising a plurality of micro-nano components corresponding to said display cells in a one-to-one manner, or a one-dimensional line-light-source array comprising a plurality of line-light-sources functioning as the light-guiding elements, or a two-dimensional point-light-source array comprising a plurality of point-light-sources functioning as the light-guiding elements;

wherein, the micro-nano component guiding beam from corresponding display cell to corresponding relay-eyebox, or, the display cell emits the beam propagating to corresponding relay-eyebox with light from corresponding line-light-source or point-light-source as directional backlight.

Preferably, said eyebox-generating device is a tunable device, with function parameters being adjustable by the control unit;

wherein, said function parameters are positions of said light-guiding elements, or/and intervals between said light-guiding elements, or/and focal lengths of said light-guiding elements, or/and arrangement directions of said light-guiding elements.

Preferably, the control unit is capable of controlling said eyebox-generating device (20) to present different function parameters sequentially at different time-points of a time period;

or, the control unit is capable of controlling said eyebox-generating device (20) to present an adaptive function parameter according to real-time positions of a viewer's pupils, to make generated relay-eyeboxes or active-eyeboxes keep tracking the viewer's pupils;

or, the control unit is capable of inactivating said eyebox-generating device's function of generating relay-eyeboxes, for implementing two-dimensional display.

Preferably, said display cell is a sub-pixel emitting monochromatic light, or a stacked structure of multiple luminous units, or an aperture with backlights of different colors incoming sequentially.

Preferably, the dense-viewpoint three-dimensional display system according to claim 1, characterized in that, said display screen is attached with a divergence-angle-adjusting device, for decreasing divergence angle of the beam from the display cell.

Preferably, the eyebox-generating device comprising at least O light-guiding elements, adjacent O light-guiding elements are endowed with O kinds of orthogonal characteristics, respectively, wherein O is an integer and O≥2;

wherein, the light-guiding element only allows light of corresponding orthogonal characteristic outgoing, and said display cells is capable of emitting light of said O kinds of orthogonal characteristics, respectively;

light-guiding elements and display cells of a same orthogonal characteristic constitute a sub-display system, and, the sub-display systems project relay-eyeboxes independently.

Preferably, said light-guiding elements of different orthogonal characteristics have different function parameters;

wherein, said function parameters refer to a distance between a light-guiding element and said display screen, or/and focal lengths of said light-guiding elements, or/and intervals between said light-guiding elements.

Preferably, said display screen has a backlight structure, providing different directional backlights at T time-points of a time period, with said display screen getting refreshed synchronously, wherein T≥2.

Preferably, the dense-viewpoint three-dimensional display system further comprising an aperture array consisting of apertures;

wherein, the aperture is attached to the light-guiding element, for adjusting clear aperture size of the light-guiding element.

Preferably, the dense-viewpoint three-dimensional display system according to claim 10, characterized in that, the aperture includes S sub-apertures;

wherein, said S sub-apertures of the aperture allow light of S kinds of orthogonal characteristics passing through, respectively, S is a positive integer and S≥2;

and, said display cells are grouped into S display-cell groups, emitting light of said S kinds of orthogonal characteristics respectively.

Preferably, the line-light-source or the point-light-source includes S sub-line-light-sources or S sub-point-light-sources projecting light of S kinds of orthogonal characteristic, respectively, S is a positive integer and S≥2;

wherein, said display cells are grouped into S display-cell groups projecting light of said S kinds of orthogonal characteristic, respectively.

Preferably, said projecting unit is composed of refractive component(s), or/and reflective component(s), or/and diffractive component(s).

Preferably, said projecting unit have different focal lengths for different orthogonal characteristic light, or/and said projecting unit have different focal lengths under control of said controlling unit.

Preferably, a unidirectional scattering sheet is attached to a composite structure constructed by said display screen and eyebox-generating device, to scatter the beam from the display cell such that the beam has a rectangular light distribution or a strip-shaped light distribution in corresponding relay-eyebox.

Preferably, said projecting unit is a transmissive device, or a reflective device.

Preferably, the dense-viewpoint three-dimensional display system is provided with an auxiliary device for guiding light from said projecting unit to a viewer to reduce affection from said eyebox-generating device.

Preferably, said projecting unit projects a real image or a virtual image of said display screen (10); and, said projecting unit projects a real image or a virtual image of said relay-eyebox.

Present disclosure further provides the following solution:

A display method based on the above-mentioned dense-viewpoint three-dimensional display system, comprising following steps:

(i) according to a pre-set position for a viewer, determining the display cells corresponding to each light-guiding element, to make generated relay-eyeboxes or active-eyeboxes cover the pupils of the viewer at said pre-set position;

(ii) refreshing said display screen (10) under control of said control unit (30);

(iii) detecting real-time positions of the viewer's pupils by tracking unit (40) at a time-point, (iv) according to positions of the viewer's pupils detected in the step (iii), re-determining display cells corresponding to each light-guiding element, or/and adjusting function parameter(s) of said eyebox-generating device (20), or/and activating backlight along an adaptive direction, to guarantee tracking of generated relay-eyeboxes or generated active-eyeboxes to the viewer's pupils;

(v) Refreshing said display screen (10) synchronously;

(vi) Repeating steps (iii) to (v).

The dense-viewpoint three-dimensional display system and the display method in present disclosure has the following benefits:

The dense-viewpoint three-dimensional display system and the display method in present disclosure takes a smallest surface structure, which can display light information independently, as the display cell. A display cell independently corresponds to a special projecting path and a special viewpoint. Compared with the traditional 3D display where one pixel (a pixel is composed of multiple surface arranged sub-pixels) corresponds to one viewpoint, under the same conditions, present design can generate more viewpoints. At the same time, discretely arranged eyeboxes are designed for gathering generated viewpoints only to the zones around the viewer's pupils, which decreases the viewpoint number needed by a VAC-free SMV 3D display.

BRIEF DESCRIPTION OF THE DRAWINGS

The accompanying drawing, which are provided for further understanding of present disclosure and constitute a part of this specification, are for explaining present disclosure together with following exemplary embodiments, but are not intended to limit present disclosure. The above and other features and advantages will become more apparent to one of ordinary skill in the art by describing in detail exemplary embodiments thereof with reference to the attached drawing. In the drawings:

FIG. 13A: rectangular zones, FIG. 13B: strip-shaped zones.

6

Figure 18:
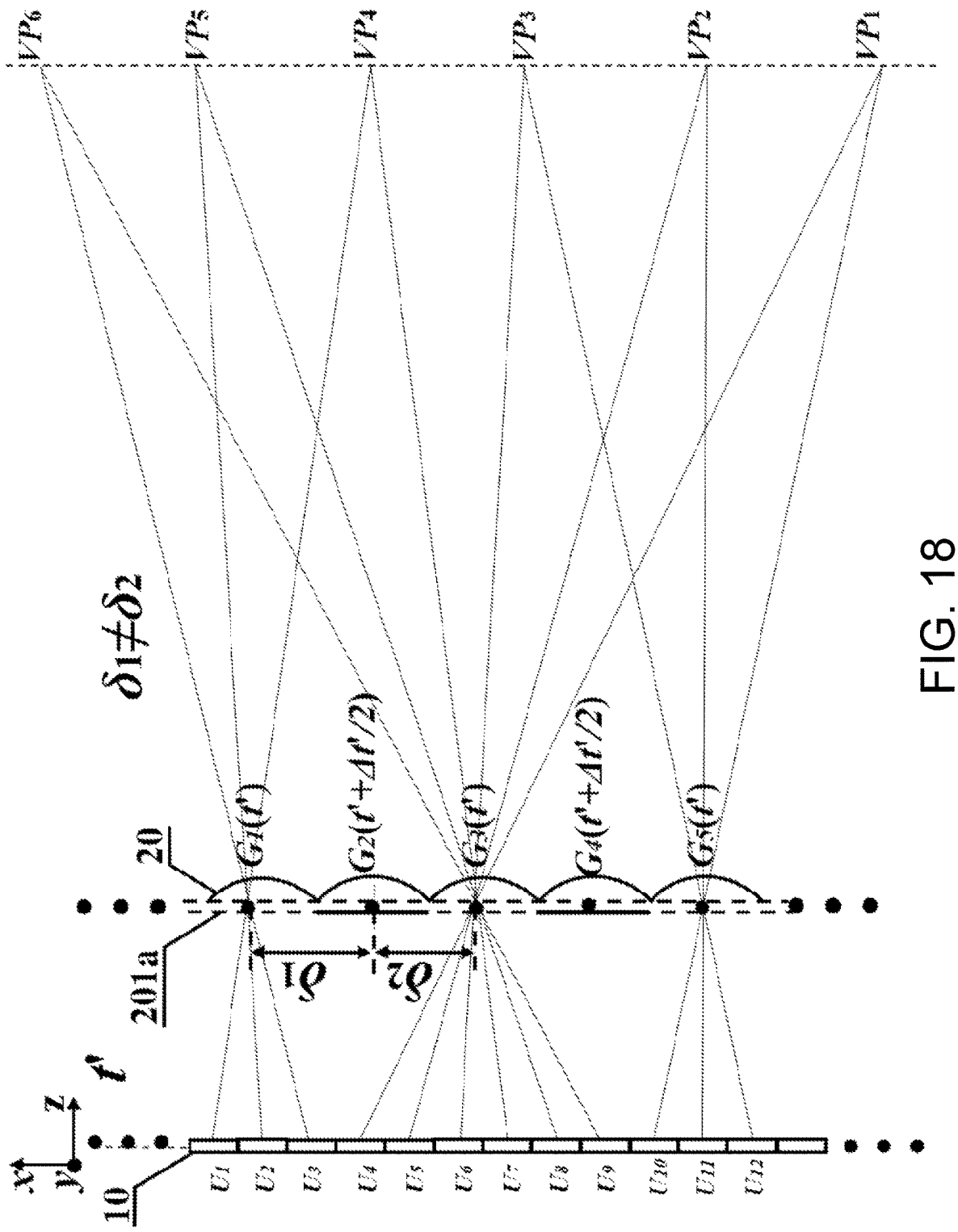

FIG. 18 shows a state of the non-uniformly arranged light-guiding elements of temporal orthogonal characteristics.

Figure 19:
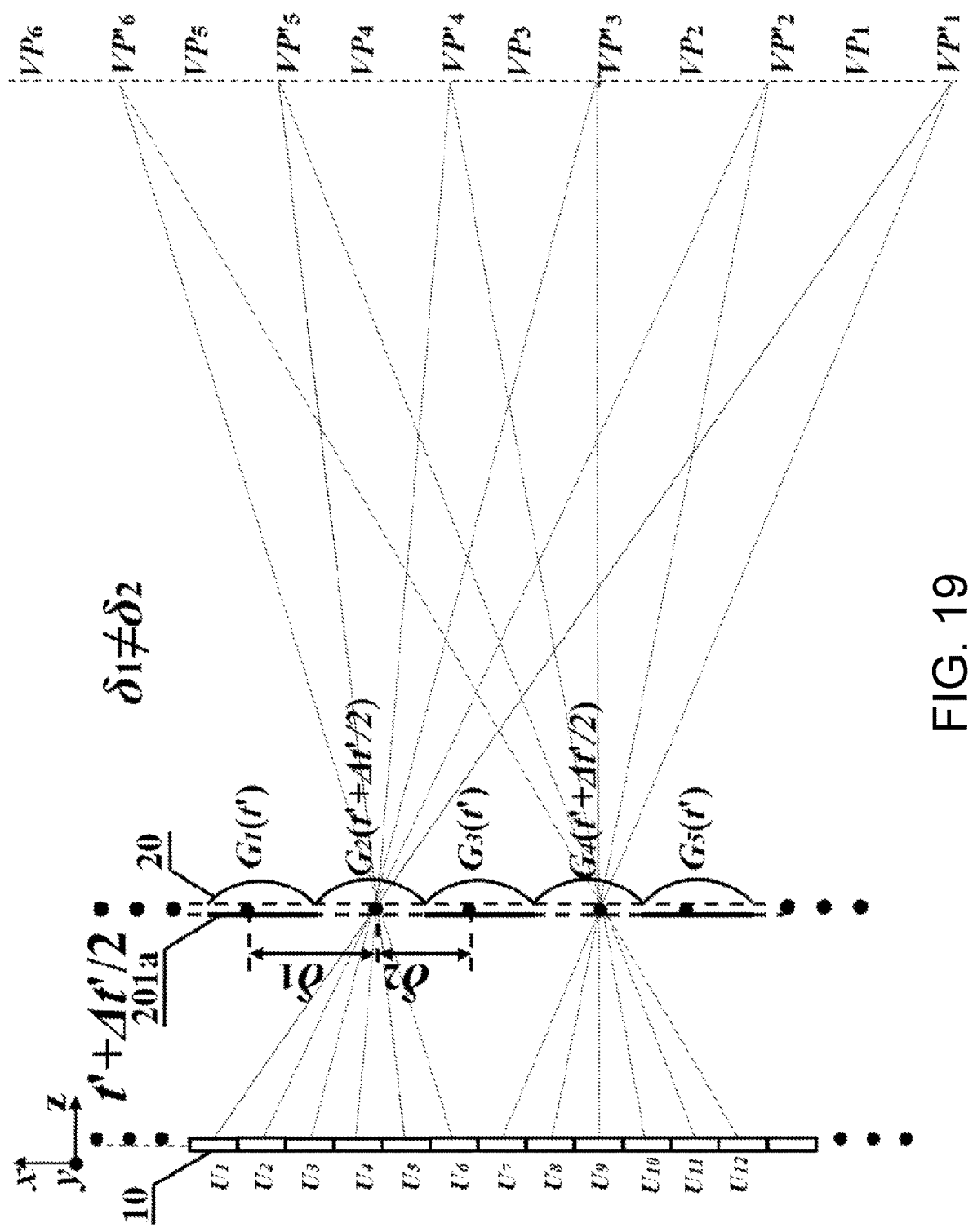

FIG. 19 shows another state of the non-uniformly arranged light-guiding elements of temporal orthogonal characteristics.

Figure 20:
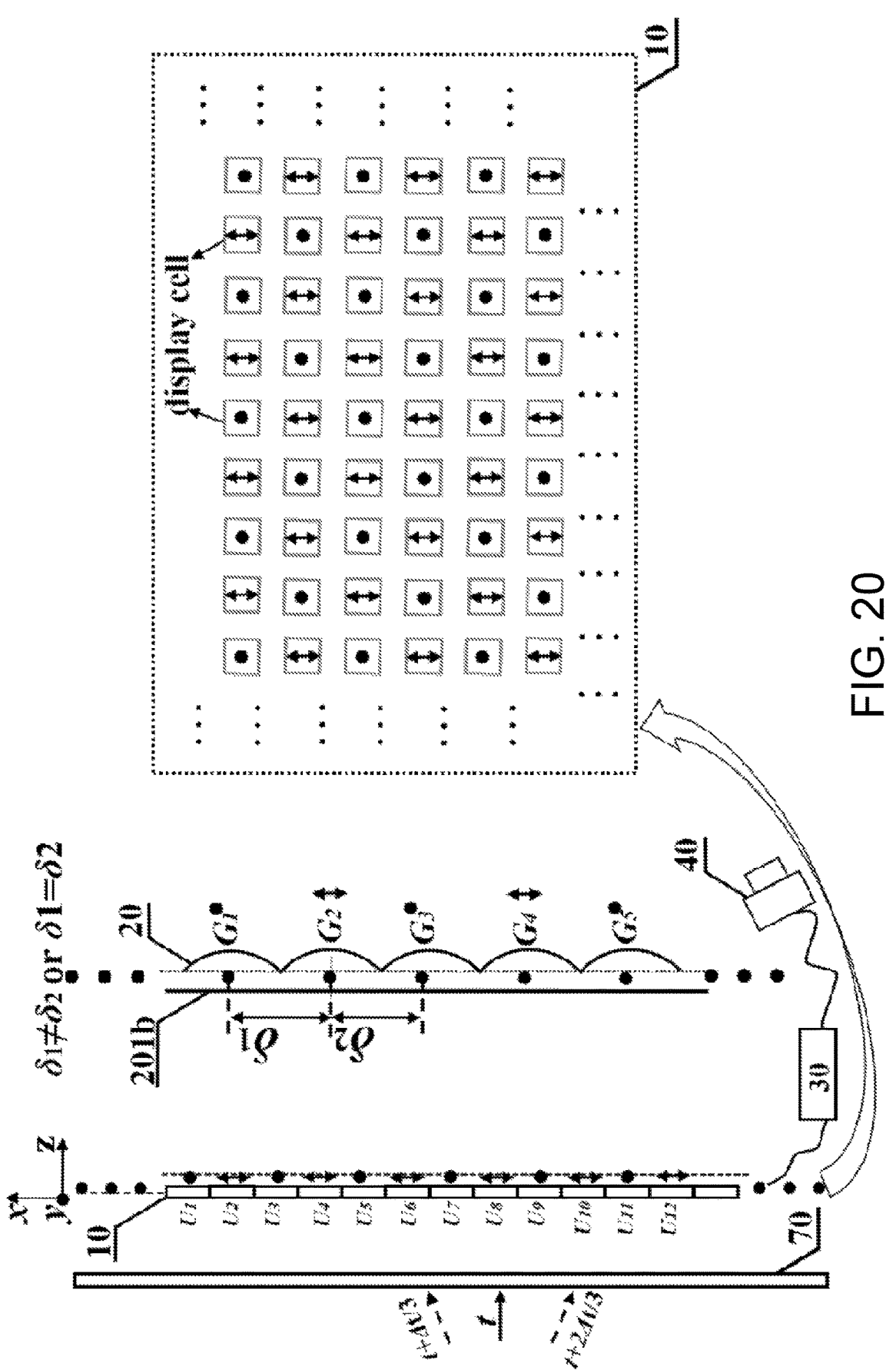

FIG. 20 shows a display structure whose light-guiding elements are endowed with polarization orthogonal characteristics.

Figure 21:
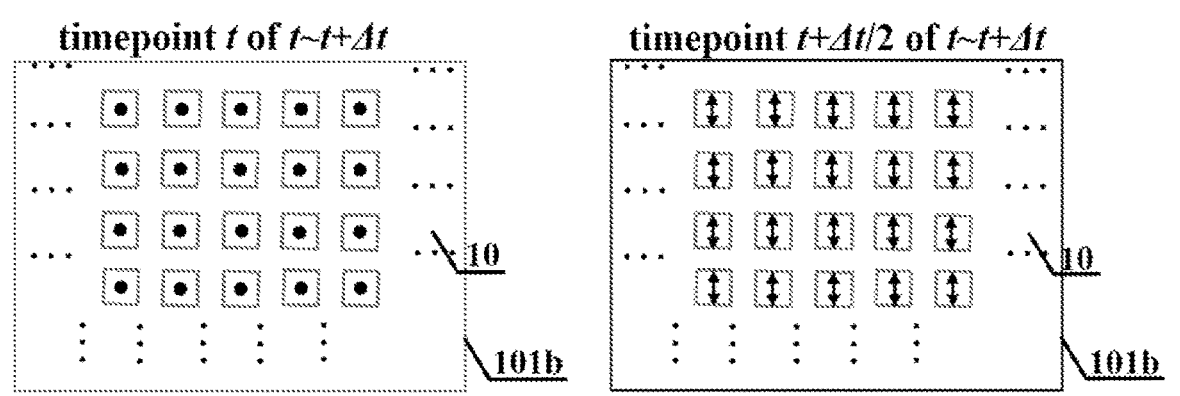

FIG. 21 shows a sequential changing of the display cell's polarization state.

Figure 22:
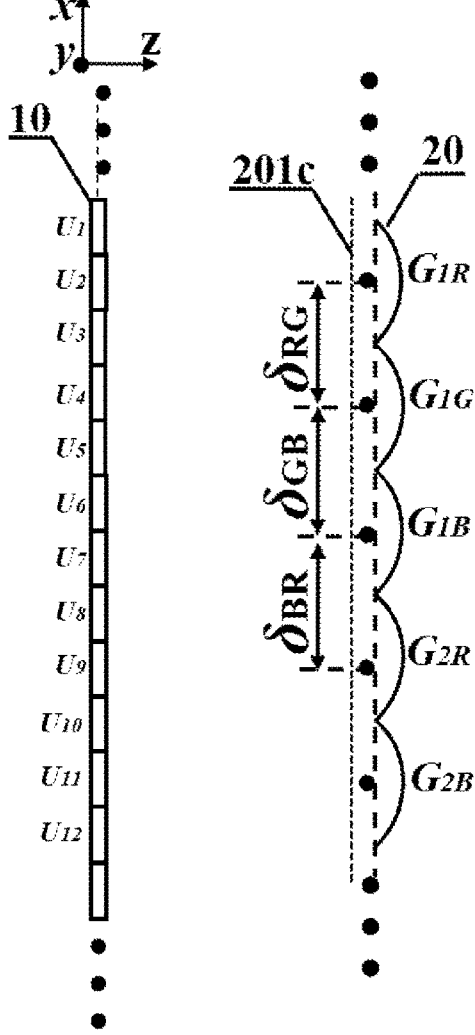

FIG. 22 is a display structure whose light-guiding elements have color orthogonal characteristics.

Figure 23:
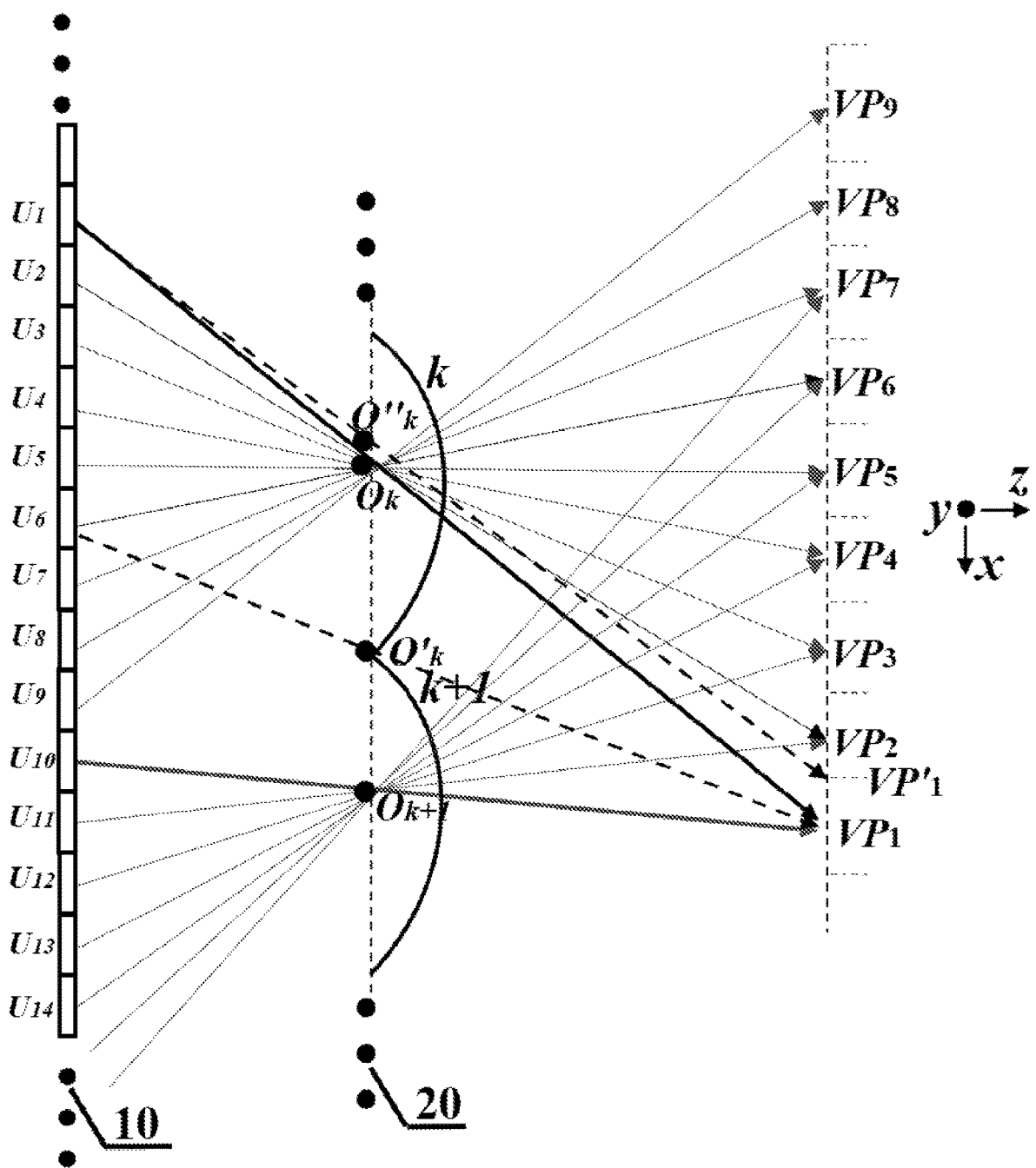

FIG. 23 shows a display structure with shiftable light-guiding elements.

Figure 24:
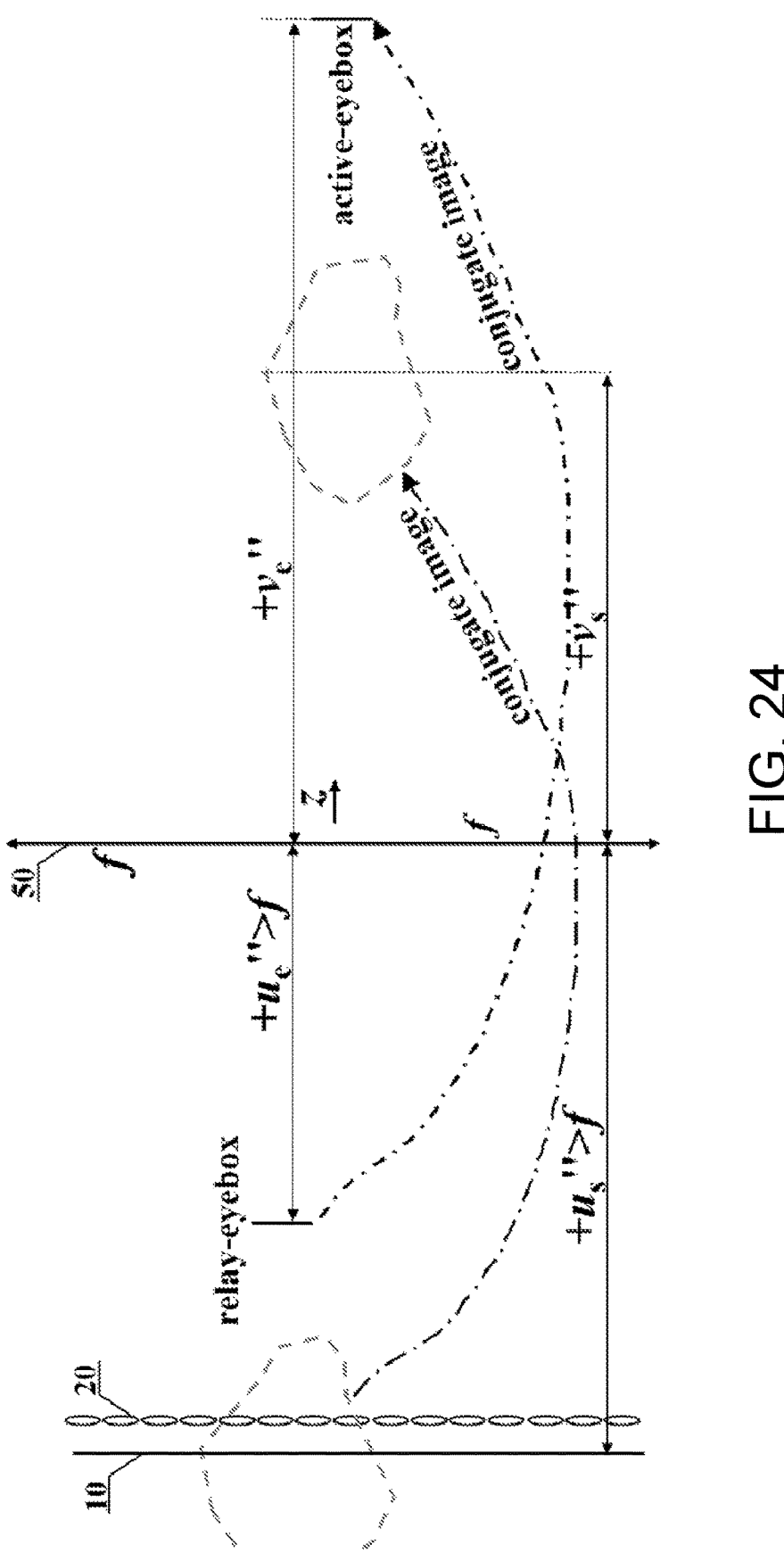

FIG. 24 shows a real image of the display screen with an active-eyebox being a real image of corresponding relay-eyebox.

Figure 25:
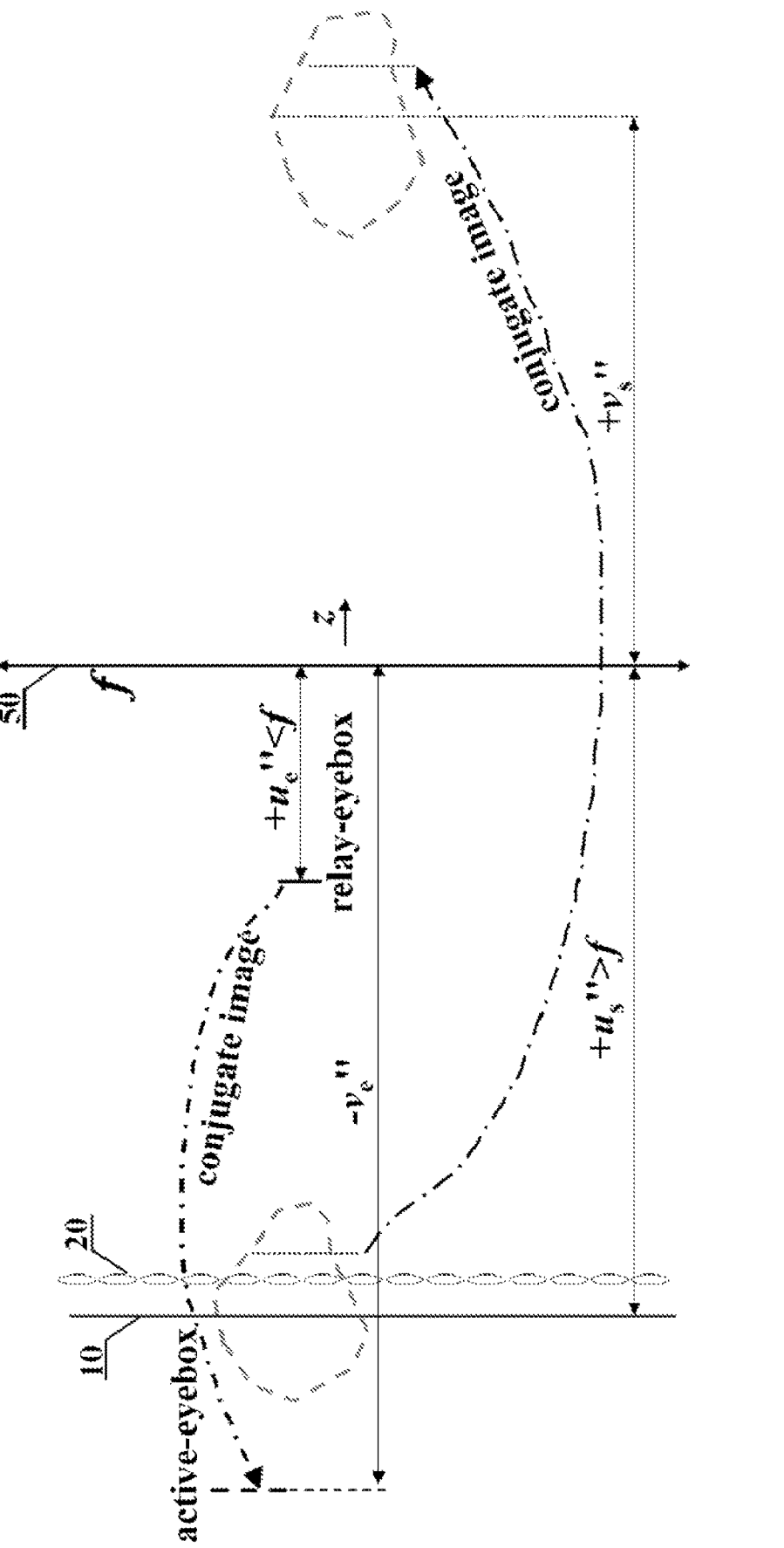

FIG. 25 shows a real image of the display screen with an active-eyebox being a virtual image of corresponding relay-eyebox.

Figure 26:
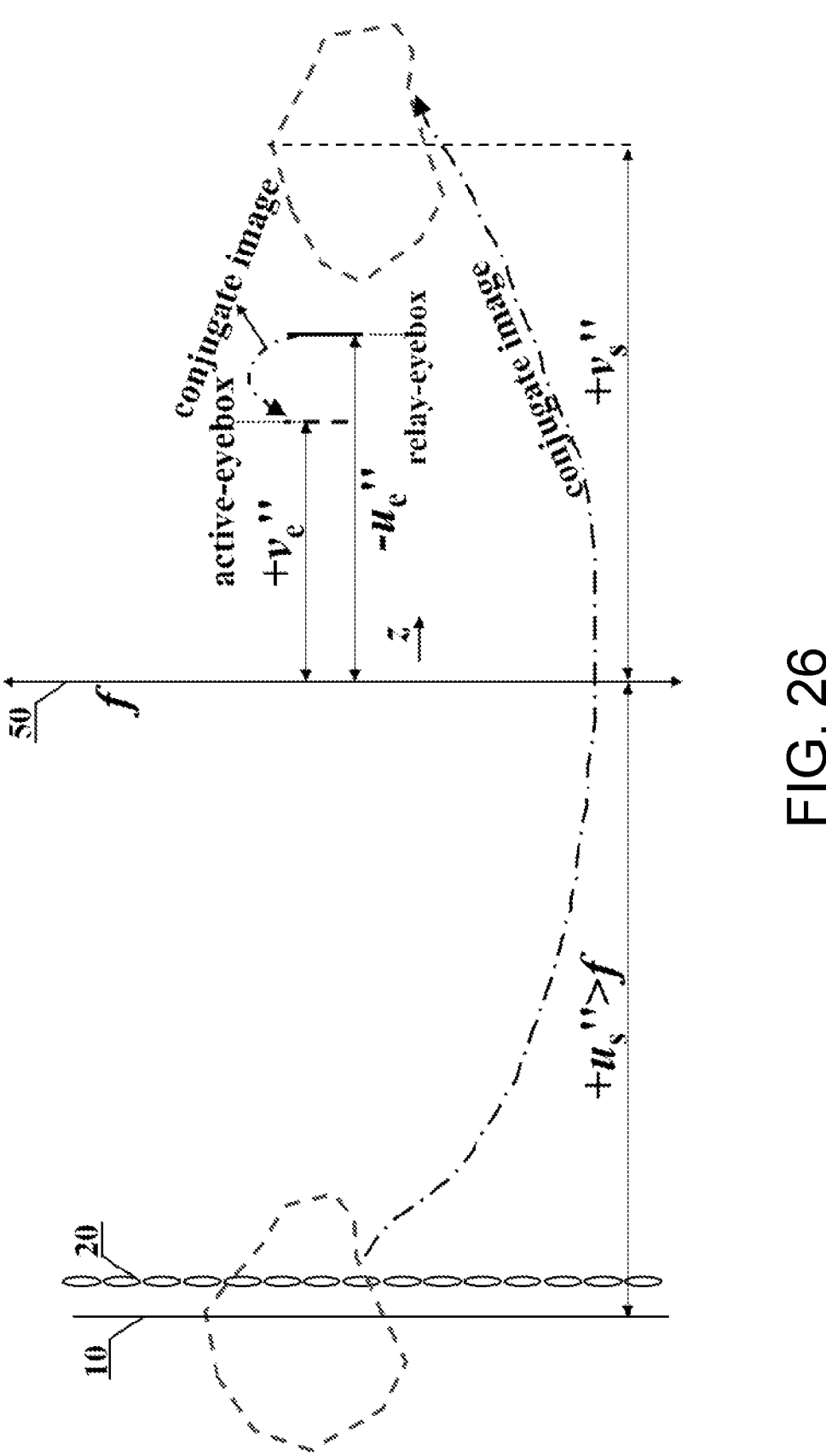

FIG. 26 shows a real image of the display screen with a relay-eyebox being with a negative object distance.

Figure 27:
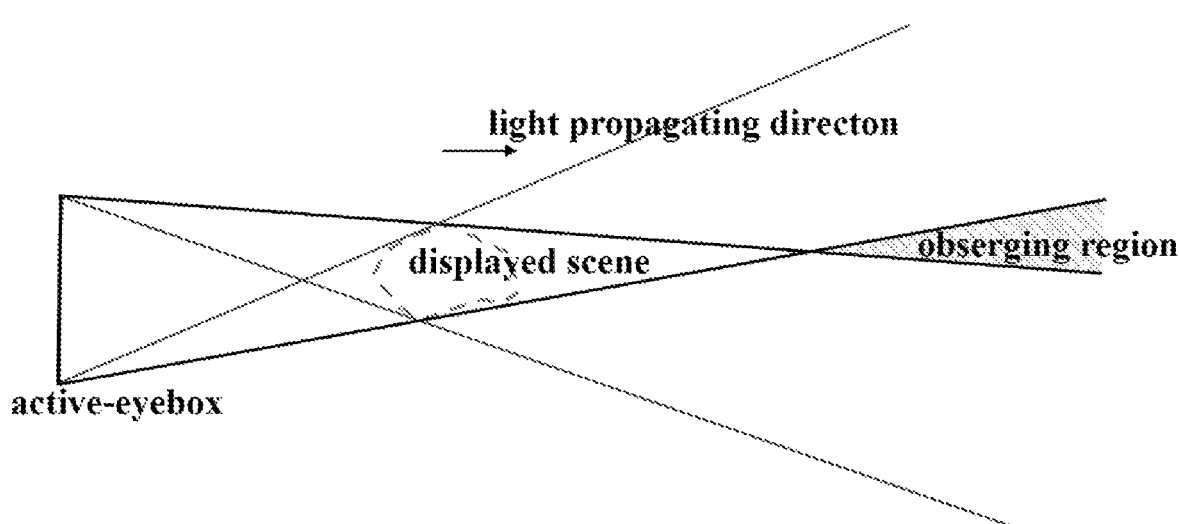

FIG. 27 shows the observing region when displayed scene is in front of the active-eyebox along the light propagating direction.

Figure 28B:
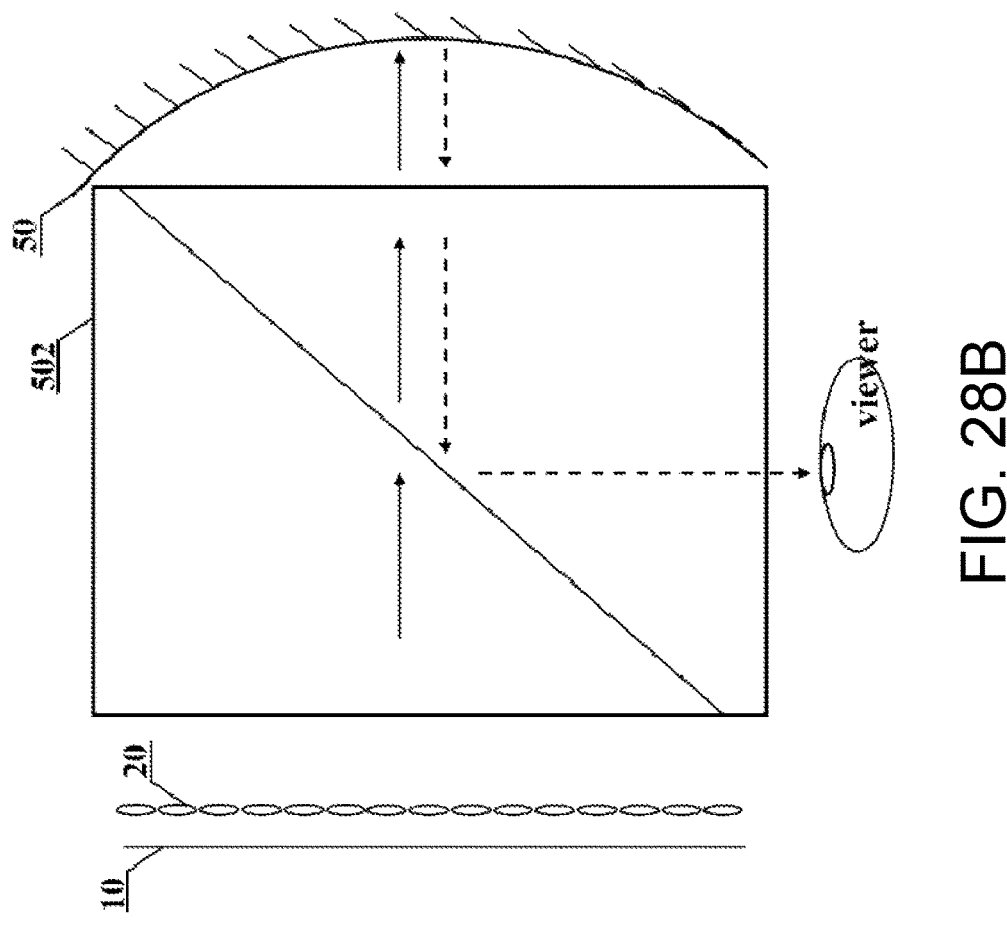
Figure 28A:
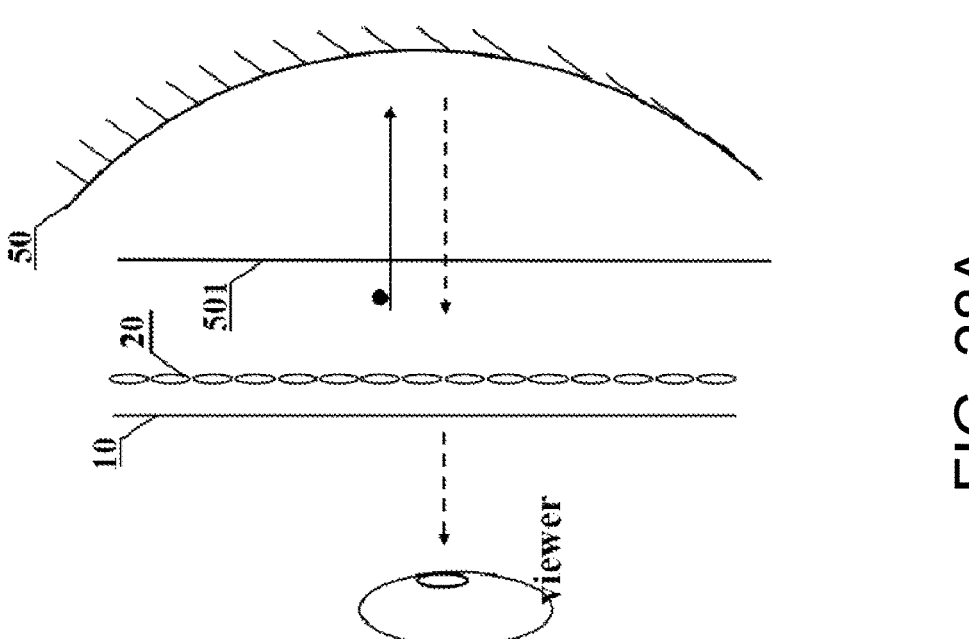

FIG. 28A and FIG. 28B show a reflective lens which functions as the projecting unit. FIG. 28A is an example of the auxiliary device, FIG. 28B is another example of the auxiliary device.

DETAILED DESCRIPTION OF EMBODIMENT

In order to enable one of ordinary skill in the art to better understand the technical solutions of the embodiments of present disclosure, a display system and a display method thereof will be described in further detail with reference to the accompanying drawing and the detailed description.

The embodiments of present disclosure will be described more fully hereinafter with reference to the accompanying drawing, but the embodiments shown may be embodied in different forms and should not be construed as limits to the embodiments set forth herein. Rather, these embodiments are provided so that this disclosure will be thorough and complete, and will fully convey the scope of present disclosure to one of ordinary skill in the art.

The embodiments of present disclosure are not limited to the embodiments shown in the drawing, but include modifications of configurations formed based on a manufacturing process. Thus, regions illustrated in the drawing are schematic, and shapes of the regions shown in the drawing illustrate specific shapes of the regions, but are not intended to be limited.

To present more viewpoints, present disclosure takes a smallest surface luminous structure as a display cell, with different display cells corresponding different projecting paths. Discretely arranged eyeboxes are also configured for gathering generated viewpoints to just regions of the pupils, for higher utilization ratio of the viewpoints. Proposed dense-viewpoint three-dimensional display system takes eyebox-generating device 20 and tracking unit 40 as core components, for implementing a VAC-free SMV 3D display.

Embodiment 1

Figure 1:
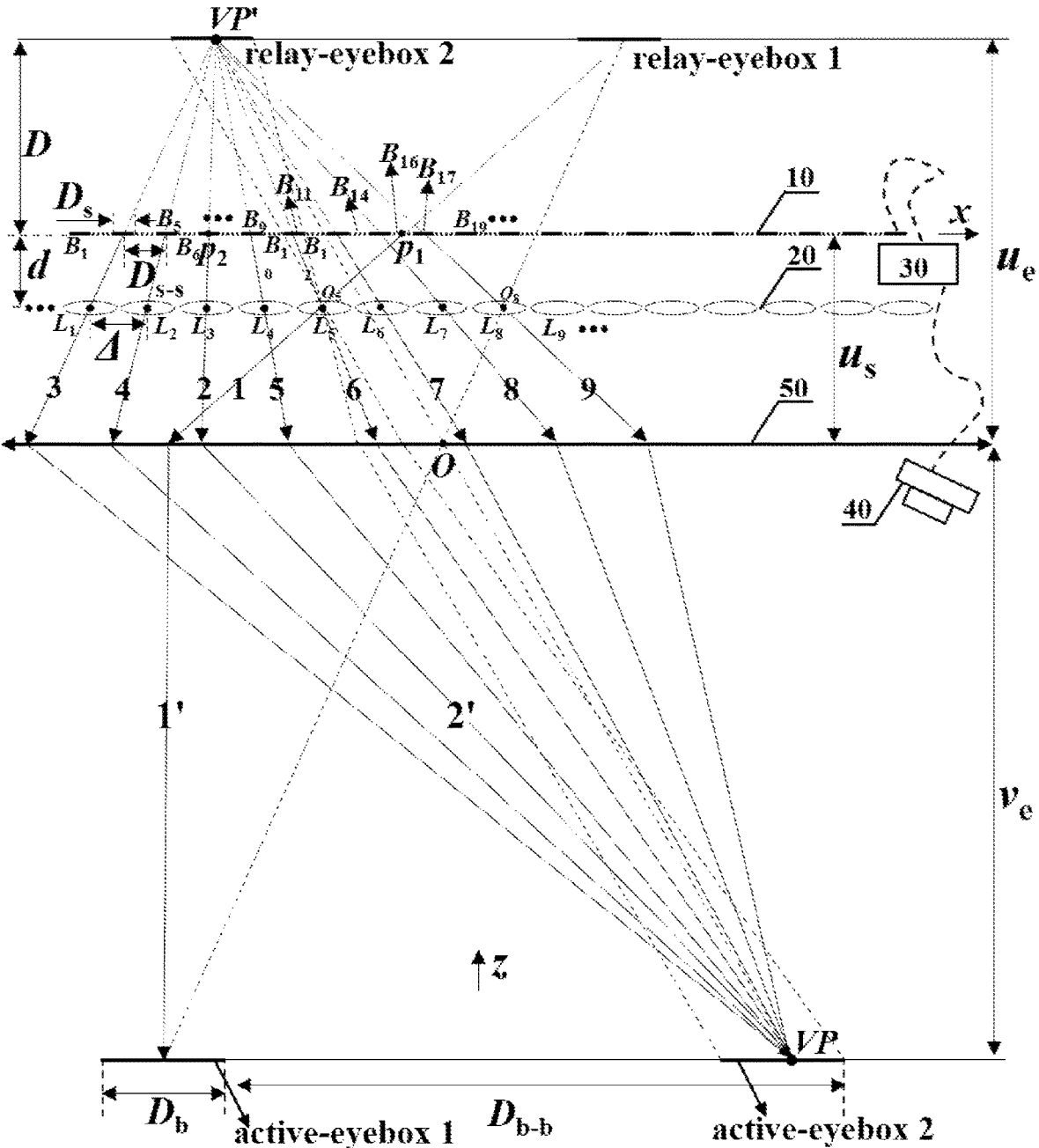
FIG. 1 shows a schematic diagram of a dense-viewpoint three-dimensional display system with virtual relay-eyeboxes.
Figure 2:
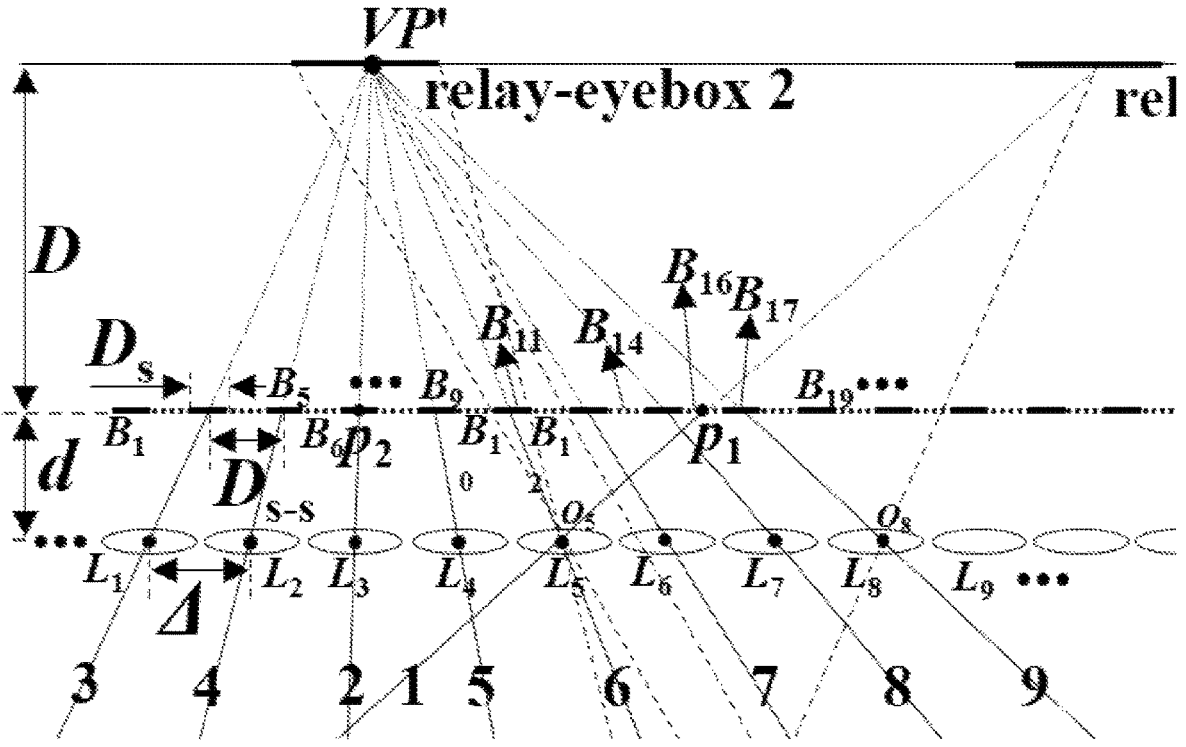
FIG. 2 is an enlarged view of partial segment of FIG. 1.
Figures 3, 4:
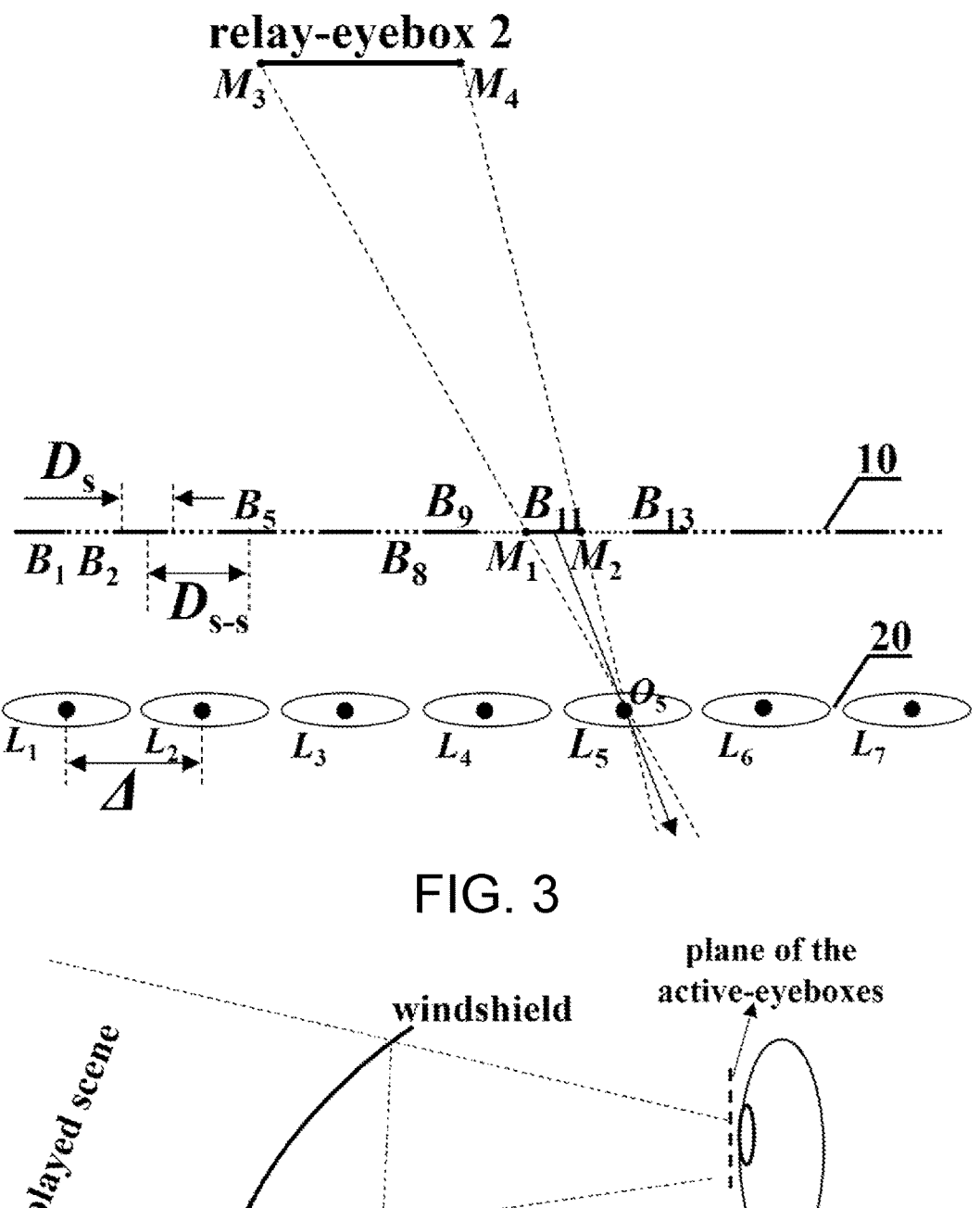
FIG. 3 shows the formation of a virtual relay-eyebox.
FIG. 4 is an application example of the proposed display system.

FIG. 1 shows a dense-viewpoint 3D display system. A relay-eyebox of FIG. 1 refers to a gathering zone of reverse extension lines of beams from corresponding display cells. Such relay-eyeboxes are called as virtual relay-eyeboxes. The display system includes a display screen 10, an eyebox-generating device 20, a projecting unit 50, a control unit 30, and a tracking unit 40. For example, a FPGA kit may be used as a control unit 30, an infrared detector or a camera may be taken as a tracking unit 40. The display screen 10 consists of display cells, which can display light information under the control of the control unit 30. A display cell in present disclosure refers to a smallest surface structure that can project light independently. For example, surface arranged monochromatic sub-pixels of a conventional display screen can be directly taken as said display cells. A stacked structure of multiple luminous units may also be taken as a display cell, such as a stacked structure consisting of three layers. Here, for example, said three layers emitting R (red) light, G (green) light, and B (blue) light, respectively. Or, an aperture with sequential backlights of different colors can function as a display cell. Actually, an indivisible surface structure, whether it emits monochromatic light or chromatic light, may be taken as a display cell. All the display cells are grouped into multiple display-cell blocks along at least one direction, and each display-cell block contains multiple display cells. As shown in FIG. 1, along the x-axis, the display cells of the display screen 10 are grouped into display-cell blocks: $B_1$, $B_2$, $B_3$, $B_4$, $B_5$, . . . . In FIG. 1, only partial display-cell blocks are marked for clarity. The serial numbers of other display-cell blocks are obvious according to their sequence arrangement. In FIG. 1, a one-dimensional lenticular grating is exampled as the eyebox-generating device 20, with its lenticular lens functioning as light-guiding elements. The eyebox-generating device 20 is placed in front of the display screen 10, with a distance d along the light propagation direction. Light-guiding elements $L_1$, $L_2$, $L_3$, $L_4$, $L_5$ . . . of the eyebox-generating device 20 are arranged along the x-axis. For clarity of the FIG. 1, only partial light-guiding elements are marked in FIG. 1. The serial numbers of other light-guiding elements are obvious according to their sequence arrangement. Along the x-direction, each light-guiding element corresponds to $N_b \geq 2$ display-cell blocks, and the display-cell blocks corresponding to a same light-guiding element are spaced by $(n \times N_b)$ display-cell blocks. Here, n is an integer and $n \geq 0$. The reverse extension lines of the beams from all display-cell blocks spaced by $(N_b-1)$ display-cell block(s) are guided to a same relay-eyebox. The distance between the display screen 10 and the relay-eyeboxes is denoted as D. Totally $N_b$ relay-eyeboxes get presented, especially with $n \geq 1$ corresponding to discretely distributed relay-eyeboxes. FIG. 1 takes $N_b=2$ and n=2 as examples. Under this condition, a light-guiding element corresponds to $N_b=2$ display-cell blocks, which are spaced by $(n \times N_b)=4$ display-cell blocks. Concretely, $N_b=2$ display-cell blocks, $B_{11}$ and $B_{16}$, correspond to a light-guiding element $L_5$. They are spaced by $(n \times N_b)=4$ display-cell blocks $B_{12}$, $B_{13}$, $B_{14}$, and $B_{15}$, as shown in FIG. 2. FIG. 2 is a partial enlargement of FIG. 1. A display-cell block projects beams through corresponding light-guiding element, and the reverse extension lines of these beams cover the corresponding relay-eyebox. For example, after passing through the corresponding light-guiding element $L_5$, reverse extension lines of the beams from the display-cell block $B_{11}$ are gathered to corresponding virtual relay-eyebox 2, as shown in FIG. 3. In FIG. 3, point $O_5$ is an optical center of the light-guiding element $L_5$. As shown in FIG. 3, the lines, connecting the point $O_5$ and edge points $M_1$ and $M_2$ of the display-cell block $B_{11}$, intersect with the relay-eyebox 2 at its edge points $M_3$ and $M_4$. FIG. 3 is also part of FIG. 1. Similarly, the display-cell blocks . . . , $B_3$, $B_5$, $B_7$, $B_9$, $B_{11}$, $B_{13}$, $B_{15}$, $B_{17}$ . . . project beams through respectively corresponding light-guiding elements . . . , $L_1$, $L_2$, $L_3$, $L_4$, $L_5$, $L_6$, $L_7$, $L_8$ . . . . Together, the reverse extension lines of these beams form the virtual relay-eyebox 2. In FIG. 1, $\Delta$ denotes the interval between adjacent light-guiding elements. According to the geometrical relationship shown in FIG. 1, the interval between adjacent display-cell blocks $D_s$ is denoted as:

$$D_s = D \times \Delta/(N_b \times (D + d)) = D_{s-s}/N_b. \qquad (1)$$

Wherein, $D_{s-s}$ is the size occupied by $N_b$ adjacent display-cell blocks. When D is a finite value, $D_{s-s} < \Delta$ in the Eq. (1). When D is infinite, $D_{s-s} = \Delta$ in the Eq. (1).

Simultaneously, the display-cell blocks . . . , $B_8$, $B_{10}$, $B_{12}$, $B_{14}$, $B_{16}$, $B_{18}$, $B_{20}$, $B_{22}$ . . . project beams through respectively corresponding light-guiding elements . . . , $L_1$, $L_2$, $L_3$, $L_4$, $L_5$, $L_6$, $L_7$, $L_8$ . . . . Their reverse extension lines form the relay-eyebox 1, as shown in FIG. 1.

As mentioned above, the eyebox-generating device 20 has an eyebox generating function: a light-guiding element corresponds to $N_b$ display-cell blocks spaced by $(n \times N_b)$ display-cell blocks; and beams (or their reverse extension lines) from $N_b$ corresponding display-cell blocks are guided to $N_b$ relay-eyeboxes in a one-to-one manner by a light-guiding element. During this process, the display-cell blocks spaced by $(N_b-1)$ display-cell blocks correspond to a same relay-eyebox.

The projecting unit 50 perceives beams from the eyebox-generating device 20, and projects the real images of said $N_b$ relay-eyeboxes to $N_b$ active-eyeboxes, respectively. Concretely, the active-eyebox 2 of FIG. 1 is the real image of the relay-eyebox 2, active-eyebox 1 is the real image of the relay-eyebox 1. The object distance and image distance are denoted as $u_e$ and $v_e$, respectively, as shown in FIG. 1. A relay-eyebox or an active-eyebox can both be called as an eyebox in present disclosure. The projecting unit 50 is an optical device with a function of imaging, such as a traditional single lens or composite lens, a Fresnel lens, a holographic lens, a micro-nano device with imaging function, or a combination of refractive component(s), or/and reflective component(s), or/and diffractive component(s). For example, the combination of curved mirror 502 and windshield 501 in FIG. 4 can be taken as a projecting unit 50. They are components of a car head-up display shown in FIG. 4.

In present disclosure, a display cell corresponds to a special projecting path. Concretely, a projecting path corresponding to a display cell is the propagation path of a beam which comes from this display cell and incidents into corresponding active-eyebox. That is to say, different display cells correspond to different projecting paths. Thus, a display cell corresponds to a viewpoint, which may also be called as a display-cell viewpoint in present disclosure. A display-cell viewpoint is the intersection point of the projecting path corresponding to this display cell with the active-eyebox corresponding to this display cell.

A display screen 10, whose pixel consists of multiple surface arranged sub-pixels of different colors, is often used in the display field. The sub-pixels of such a pixel occupy different locations on the display screen 10. In traditional 3D display, a pixel is designed to project a color beam along a corresponding projecting path to a viewpoint. That is, sub-pixels of such a pixel correspond to a common projecting path and a common viewpoint. However, in present disclosure, sub-pixels of such a pixel correspond to different projecting paths with a sub-pixel functioning as a display cell. Sub-pixels of a pixel correspond to different viewpoints. So, the design of display cells will bring more viewpoints.

A point in a relay-eyebox, such as a point VP' in the relay-eyebox 2, corresponds to an image point VP in the corresponding active-eyebox 2. A point in an active-eyebox is taken as a view viewpoint when it satisfies following characteristics. A view viewpoint is an overlapping point of multiple display-cell viewpoints. The display cells corresponding to these overlapped display-cell viewpoints comprise at least one display cell from each corresponding display-cell block. Here, said "each corresponding display-cell block" refers to each display-cell block corresponding to the active-eyebox containing this view viewpoint.

Control unit 30 drives a display screen 10 to load light information. The loaded information of a display cell takes the projection information of the to-be-displayed scene along corresponding projection path. Thus, at a view viewpoint VP, a 2D perspective view will be perceived. If beams from each display-cell block are all guided to different view viewpoints and the interval between adjacent view viewpoints is smaller than pupil diameter $D_p$, a VAC-free SMV 3D display will get implemented. Obviously, a point in an active-eyebox, such as the point VP in the active-eyebox 2, may be a view viewpoint, or not. For each display point, as long as there are at least two passing-through beams to be perceived by each pupil, a VAC-free SMV 3D display is reachable. Present disclosure takes VAC-free 3D display as our goal, based on the setting of "a display cell corresponds to a special projecting path" and "different display cells correspond to different projecting paths". For a display point, when only one passing-through beam is guided to each pupil in proposed display system, a 3D display can also get implemented based on conventional stereoscopic technology, especially when a display cell can emit color light.

Actually, the beam from a display cell will have a divergence angle, even has been modulated by corresponding light-guiding element. The projecting path corresponding to a display cell often takes a ray of the beam coming from this display cell and guided to corresponding active-eyebox, by corresponding light-guiding element.

According to the geometric relationship shown in FIG. 1, the eyebox size $D_b$ is determined by:

$$D_6 = (v_e/u_e) \times D_s \times (D+d)/d = (v_e/u_e) \times D \times \Delta/(N_b \times d). \quad (2)$$

Distance between adjacent eyeboxes is:

$$D_{b-b} = (n \times N_b + 1) \times D_b. \quad (3)$$

When two pupils of a viewer are covered by two active-eyeboxes, respectively, following equations should be satisfied:

$$D_b \geq D_p, \quad (4)$$

$$\text{and, } D_{e-e} - D_b < D_{b-b} < D_{e-e} + D_b. \quad (5)$$

Here, $D_p$ denotes the diameter of a pupil. Two pupils of a viewer can also be covered by only an active-eyebox, with different active-eyeboxes being designed for different viewers. In this case, $D_b > D_{e-e}$ is necessary.

FIG. 1 takes n=2 as example. It is noteworthy that n=0 corresponds to a special case: $N_b$ relay-eyeboxes will appear seamlessly and connect together into a continuous observing region. All optical structures and display methods proposed by present disclosure, including those discussed in following sections, are applicable to the case of n=0.

Figure 5B:
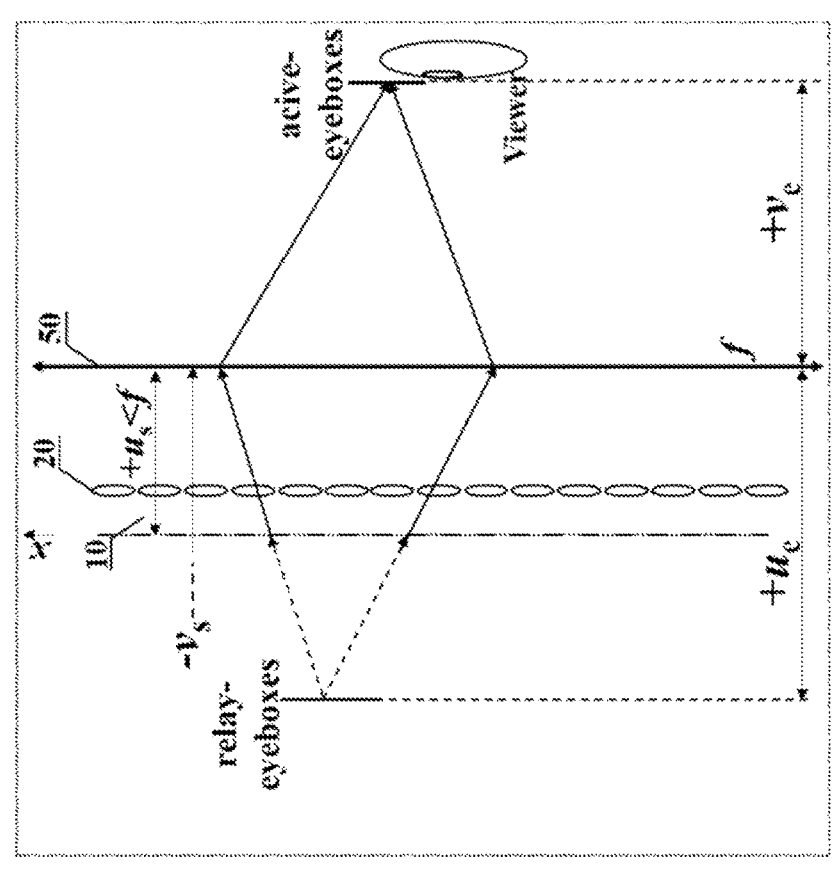
FIG. 5A and FIG. 5B show the position relationship between the relay-eyeboxes and the projecting unit.
Figure 5A:
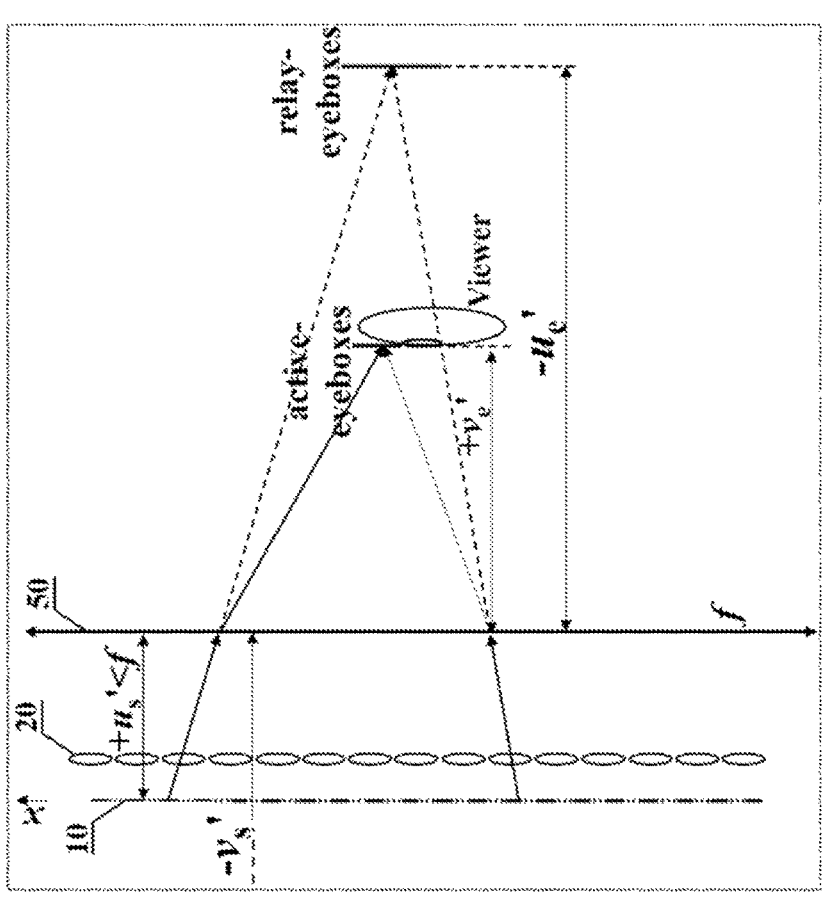

In this embodiment, the introduction of the virtual relay-eyeboxes provides conveniences for adjusting the distances between projecting unit 50 and the active-eyeboxes. For example, when the proposed display system is taken as a car head up display (HUD), a windshield is a component of the projecting unit 50, as shown in FIG. 4. A distance of about 1000 mm is required between the observing region and the windshield actually. In a traditional 3D display, beams from different pixels of a display screen are guided to different real viewpoints. Under this condition, inserting a projecting unit 50 between the display screen 10 and the real viewpoints, an enlarged virtual image of the display screen 10 can be projected. Such real viewpoints construct up a similar relay-eyebox, which is also called as a real relay-eyebox, as shown in FIG. 5A. Such a real relay-eyebox is a gathering zone of real beams when the projecting unit 50 is not inserted. A real image of a real relay-eyebox is projected by the projection unit 50 to the viewer's pupils, which is also called as an active-eyebox. In this case, the image distance $+v_e'$ of such an active-eyebox is set as about 1000 mm (about 1000 mm is needed by application scenario of car HUD), the equivalent focal length f of the projecting unit 50 should be >1000 mm, according to the imaging formula $(-1/u_e' + 1/v_e')$ =1/f. Here, $-u'_e$ refers to a negative object distance of the real relay-eyebox and $+v_e'$ is a positive image distance of the active-eyebox. To guarantee a large magnification of virtual image of the display screen 10, the display screen 10 should be located near to focal plane of the projecting unit 50. Thus, a projecting unit 50 of a focal length f>1000 mm will result in a thick structure. In present disclosure, a positive object distance $+v_e$ of the virtual relay-eyeboxes results in a positive image distance $+v_e$ of the active-eyeboxes, as shown in FIG. 5B. According to the imaging formula $(1/u_e + 1/v_e) = 1/f$, a small focal length of projecting unit 50 also can reach to an about 1000 mm image distance of the active-eyebox, resulting in a relatively thinner structure.

FIG. 1 is exampled with $N_b$=2. A larger $N_b$ will generate more active-eyeboxes. During displaying, light from non-corresponding display cells may pass through a light-guiding element as crosstalk noise. A viewer's pupil may also be placed with some distance from the active-eyeboxes.

To implement 3D display by said display system, following steps are required. Firstly, according to a pre-set position for a viewer, determine the display cells corresponding to each light-guiding element, to make generated relay-eyeboxes or active-eyeboxes cover the pupils of the viewer at said pre-set position. The control unit 30 refreshes all display cells by corresponding projection information under driven of the control unit 30, for projecting corresponding active-eyeboxes. Then, when necessary, such as when generated active-eyeboxes can no longer cover the viewer's pupils, the generated active-eyeboxes should be configured to keep tracking the pupils. According to the real-time positions of the pupils detected by the tracking unit 40, re-determining display cells corresponding to each light-guiding element, or/and adjusting function parameter(s) of said eyebox-generating device 20, or/and activating backlight along an adaptive direction, to make newly generated active-eyeboxes keep tracking the pupils. In this process, the display screen 10 is refreshed synchronously. Repeat these steps to implement 3D display.

Figure 6:
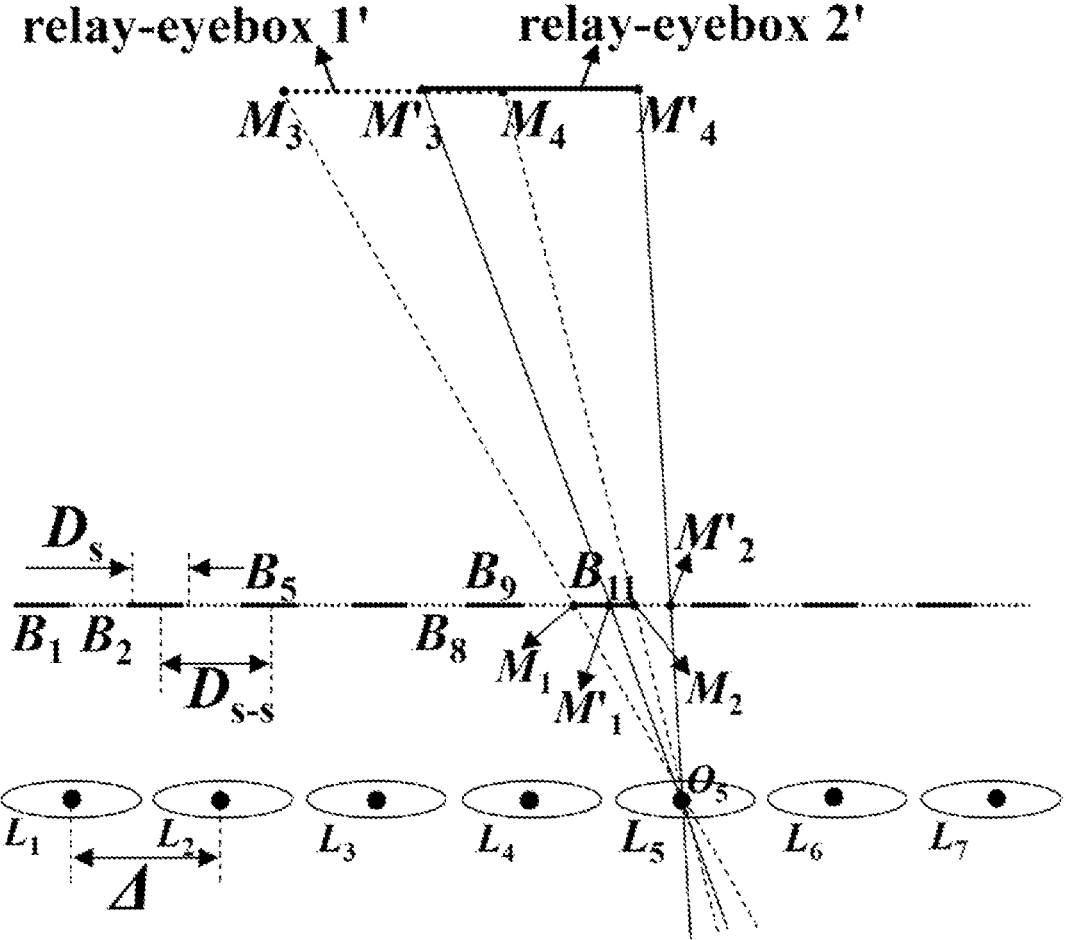
FIG. 6 shows the shifting of a relay-eyebox with shifting of the corresponding display-cell block.

As exampled in FIG. 6, when the display cells corresponding to a light-guiding element change, positions of the generated active-eyeboxes will change correspondingly. Concretely, when the display-cell block corresponded by a light-guiding element $L_5$ changes from a $M_1M_2$ zone to a $M'_1M'_2$ zone, generated relay-eyebox moves from a $M_3M_4$ zone to a $M'_3M'_4$ zone. They are denoted as relay-eyebox 1' and relay-eyebox 2', respectively. Of course, generated active-eyeboxes will take some location displacement correspondingly. Thus, according to positions of the pupils, through re-defining display cells corresponding to each light-guiding element, generated active-eyeboxes can keep tracking the viewer's pupils dynamically.

Obviously, when generated active-eyeboxes can cover the whole observing region, the tracking unit 40 is no longer needed. This is especially suitable for the case of n=0.

Figures 7A, 7B:
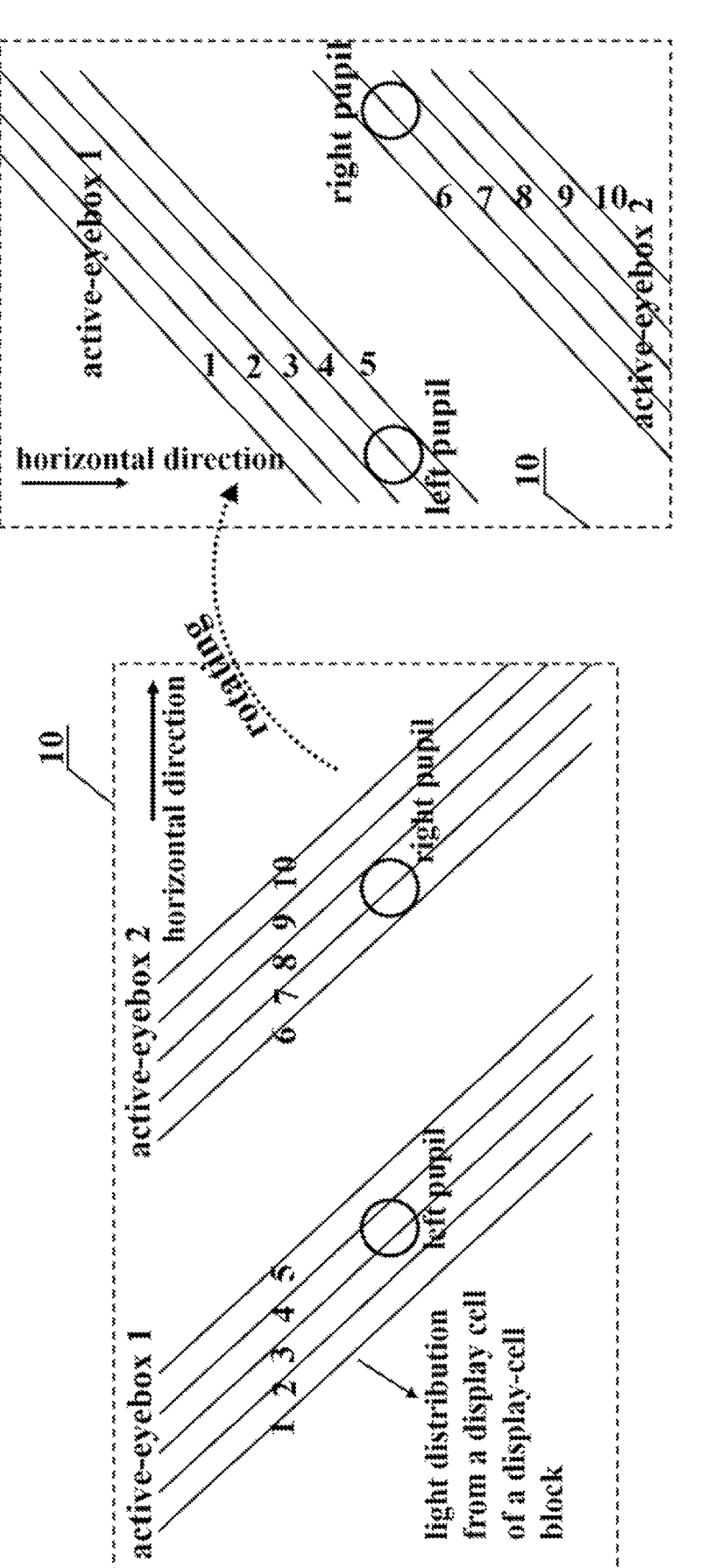
FIG. 7A and FIG. 7B show rotated active-eyeboxes with rotating of the display panel/eyebox-generating device structure.

The eyebox-generating device 20 can also be a tunable device, with adjustable function parameters. For example, when the eyebox-generating device 20 gets implemented by a liquid crystal device, its function parameters may be adjusted by the control unit 30. Said function parameters include, but not limited to, the position of each light-guiding element, interval between two light-guiding elements, focal length of each light-guiding elements, and arrangement direction of the light-guiding elements. By adjusting said function parameter(s) of the eyebox-generating device 20 real-timely, generated active-eyeboxes may take some location displacement. For example, shifting the one-dimensional lenticular grating (functioning as eyebox-generating device 20) while display cells corresponding each lenticular lens keeping unchanged, the generated active-eyebox will take some location displacement correspondingly. Rotating the one-dimensional lenticular grating will also bring a rotation of the generated active-eyeboxes. An application scenario is taking the proposed display system as a portable device. The viewer may hold it vertically or horizontally. These two states may need rotating the one-dimensional lenticular grating correspondingly to change the arrangement direction of generated active-eyeboxes correspondingly. Furthermore, if the arrangement direction of the generated active-eyeboxes is inclined to both the vertical direction and the horizontal direction, without changing the arrangement direction of generated active-eyeboxes (relative to the display screen), the generated active-eyeboxes may directly cover the viewer's pupils under these two states, as exampled by FIG. 7A and FIG. 7B. With one-dimensional lenticular grating, light distribution from a display cell has a strip-shaped shape, which is denoted by a line in FIG. 7A and FIG. 7B. Lines 1, 2, 3, 4, 5 denote light distributions from different display cells of a display-cell block, lines 6, 7, 8, 9, 10 denote light distributions from different display cells of another display-cell block. With such strip-shaped light from a display cell, tracking unit 40 is often needed, to restrict the projection path of a display cell further to be "the propagation path of a beam which comes from this display cell and incidents into corresponding pupil" when necessary. Thus, according to the real-time position of a pupil, the display cells should get refreshed synchronously with corresponding projection paths. Of course, in FIG. 7A and FIG. 7B, the generated active-eyeboxes can take further location displacement as discussed above. The rotating shown by FIG. 7A and FIG. 7B is also applicable to the case of n=0.

When a light-guiding element has a focal length or an equivalent focal length, the focal length of the light-guiding elements can be adjusted under the control of the control unit 30 to change the waist position of a beam from a display cell.

In proposed disclosure, when a light-guiding element has a focal length or an equivalent focal length, display cells often locate at corresponding focal plane. They may also locate at a distance away from said focal plane.

When an eyebox-generating device of a one-dimensional structure is used, such as a one-dimensional lenticular grating, the light distribution of a beam on the plane of the active-eyebox has a strip-shaped shape. Under this condition, the projecting path corresponding to a display cell optimally takes the propagation path of a beam which comes from this display cell and incidents into corresponding pupil. Under this condition, the tracking unit 30 is often needed.

The eyebox-generating device 20 can also be a stacked structure consisting of more than one layers, with each layer being with a special function. Concretely, liquid crystal devices may function as such layers. Different layers function as different eyebox-generating devices independently. And each layer can be activated or inactivated under the control of the control unit 30. In an inactivated state, a layer has uniformly distributed refractive index. Or different combinations of the layers function as different eyebox-generating devices. For example, each layer functions as a special one-dimensional lenticular grating, and different layers are with different function parameters.

In summary, there exist different methods for implementing pupil tracking by generated active-eyeboxes, changing the function parameters of the eyebox-generating device 20, or re-defining display cells to each light-guiding element, or both of them. A one-dimensional lenticular grating is exampled above. This is applicable to other kinds of eyebox-generating devices 20. The eyebox-generating device 20 may also be invalidated for implementing 2D display. For example, an eyebox-generating device 20 based on liquid-crystal device can be converted into a two-dimensional liquid crystal panel with uniform refractive index.

The tunable eyebox-generating device 20 can present different function parameters at different time-points of each time period, for generating more active-eyeboxes based on persistence of vision. Under this condition, the active-eyeboxes generated at different time-points may overlap, resulting in increased resolution of each perspective view or increased viewpoint density. The active-eyeboxes generated at different time-points also can be arranged with dislocations, for enlarging the observing region. Obviously, such a tunable device eyebox-generating device 20 is also applicable to the proposed display system with n=0.

Figure 8:
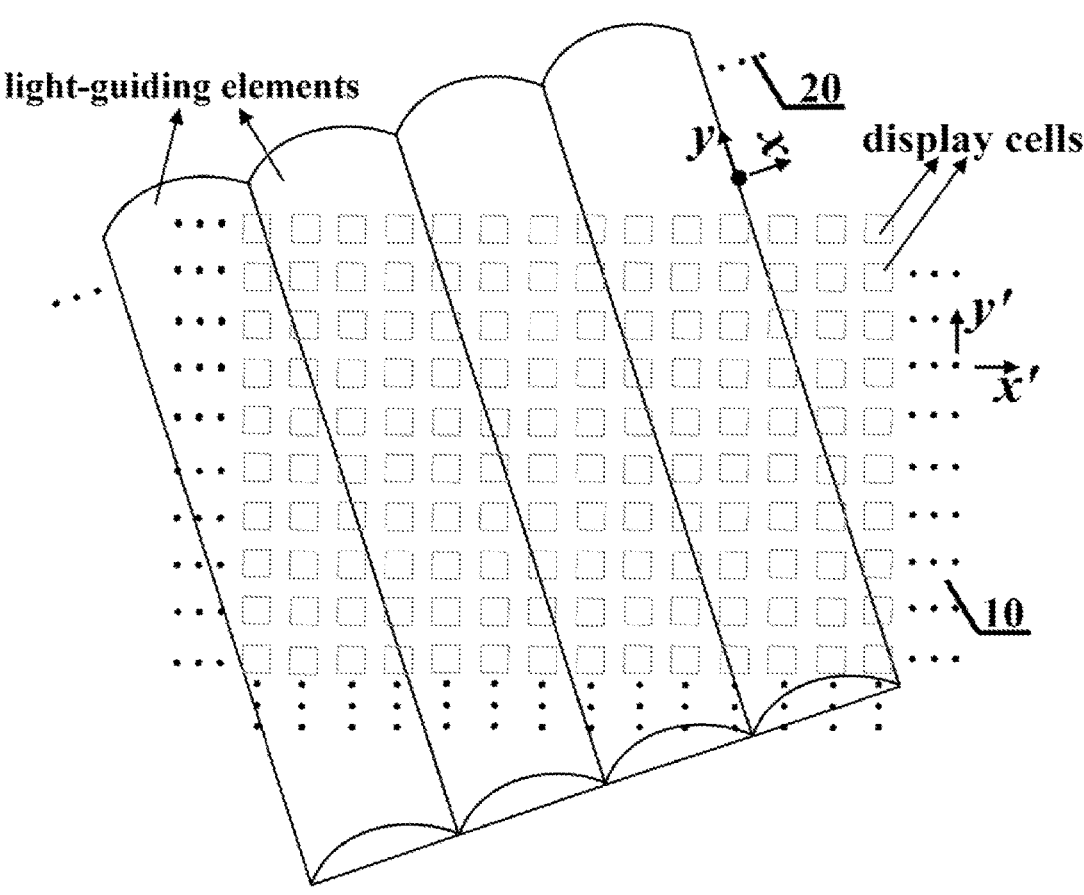
FIG. 8 shows a common geometrical relationship between arrangement directions of lenticular lenses and display cells.

In FIG. 1, the arrangement direction of the display cells and that of the light-guiding elements may take an inclination angle, as shown in FIG. 8. In FIG. 8, a display cell is shown with a square shape. The display cell can also take other shapes, such as a rectangular shape. The display cells shown in FIG. 8 are arranged along two mutually perpendicular directions. These two directions also may be non-perpendicular to each other. Present disclosure does not impose any restrictions on arrangement of the display cells.

The display cell of present disclosure refers to a smallest surface structure that can emit light independently. Conventional display screens often take surface arranged multiple sub-pixels to be tiled together as a pixel. Here, take a common RGB display panel as example. The common RGB display panel takes three sub-pixels as a pixel, with these three sub-pixels of a pixel being arranged on the surface of the display panel. These three sub-pixels emit red (R), green (G), and blue (B) light, respectively. In conventional display, a pixel is taken as a display unit which emits a color beam, which is called as pixel-design. Thus, different sub-pixels of a pixel correspond to one common projecting path and one common viewpoint. That is to say, different sub-pixels of a pixel correspond to one projected beam, also this projected beam composes of three color components. In present disclosure, three sub-pixels of such a pixel are taken as three independent display cells. They correspond to different projecting paths and they optimally correspond to different viewpoints. This strategy is called as display-cell-design. Said "they correspond to different projecting paths" means that three sub-pixels of such a pixel respectively correspond to three beams. So, under the same condition, comparing to conventional pixel-design, display-cell-design of present disclosure can increase the number of projected beams and the number of viewpoints. This kind of gain is extremely beneficial for VAC-free SMV 3D display, which needs more projected beams for re-building spatial light points. It should be noted that when a sub-pixel emits monochrome light, the optical information loaded to this sub-pixel is only corresponding color component.

Figure 9:
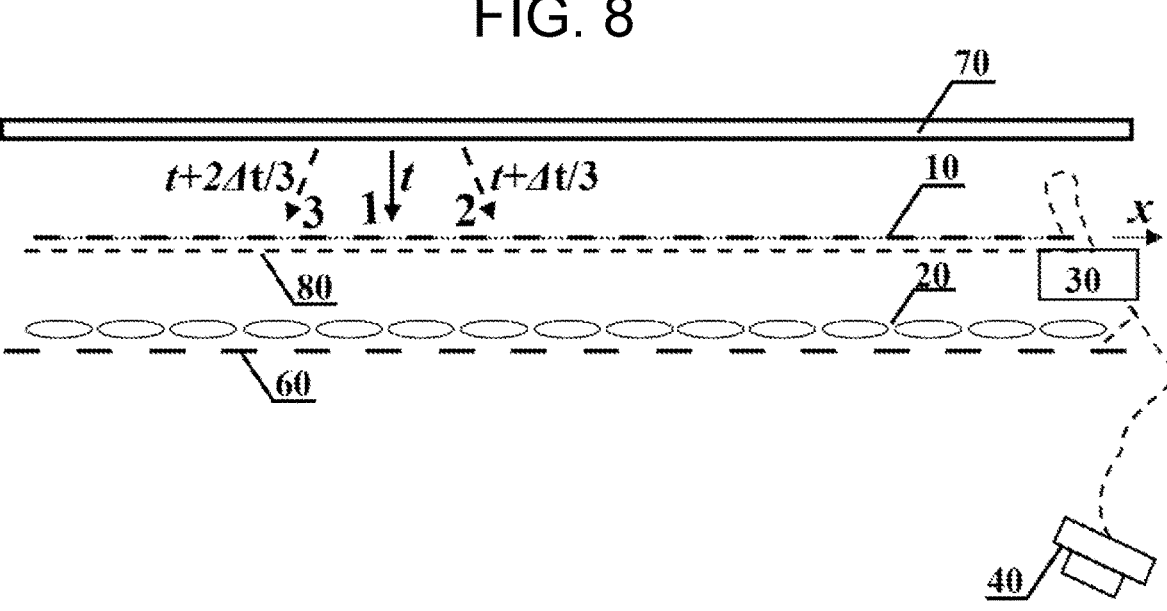
FIG. 9 is a display system with an aperture array.

The dense-viewpoint 3D display system of present disclosure can further include an aperture array 60. The aperture array 60 consists of apertures, as shown in FIG. 9. Said apertures correspond to the light-guiding elements in a one-to-one manner, for adjusting the clear aperture size of each light-guiding element. For example, a liquid-crystal light valve array can be taken as an aperture array 60, with light valves functioning as the apertures. The size of such a light valve can be adjusted under the control of the control unit 30. Some optical medium may be filled into the space between the display screen 10 and the eyebox-generating device 20, such as optical adhesive.

The display screen 10 may be different kinds of display devices, such as micro-LED screen, OLED screen, LCD screen, etc. Present disclosure does not impose any restrictions on the types of the display screen and on the layout method of its display cells. For example, the display screen 10 may also be a curved screen.

Figure 10:
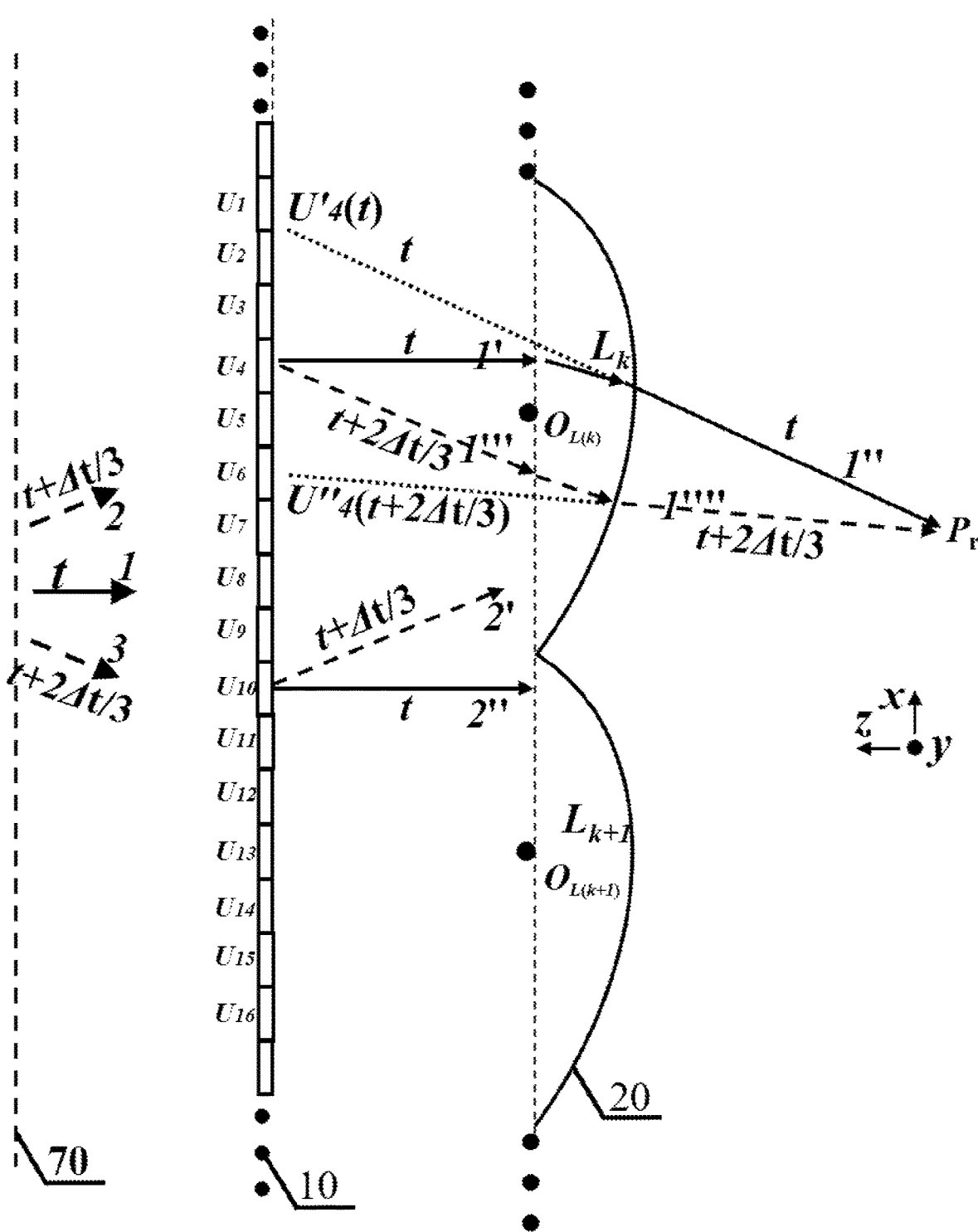
FIG. 10 shows the principle of improving display resolution by directional backlights.

When a backlit display screen 10 is chosen, as shown in FIG. 9, a backlight unit 70 may provide directional backlights along T>1 directions. With T=3 as example, at T=3 time-points t, $t+\Delta t/3$, and $t+2\Delta t/3$ of a time period $t \sim t+\Delta t$, the backlight unit 70 projects backlight along path 1, path 2, and path 3, respectively, as shown in FIG. 10. A backlight unit 70 may take different kinds of possible optical structures. For example, the backlight is from a color point light source and then is transformed into a parallel light through a collimating lens. Or the backlight is from a small aperture with R, G, B lights incoming sequentially.

FIG. 10 takes a display cell $U_4$ as an example. At time-point t of a time period $t \sim t+\Delta t$, a backlight comes along the path 1. The display cell $U_4$ emits light along a path 1', and then the light is guided by corresponding light-guiding element $L_k$ to a point $P_r$ along a path 1" after passing through the corresponding light-guiding element. Thus, the beam received by point $P_r$ along path 1" is equivalent to that being emitted from point $U_4$ of the display screen 10. Point $U_4$ is the intersection of the path 1" with the display screen 10. So, at the time-point t, the propagating direction of the beam from display cell $U_4$ is the path 1". That is to say, at the time-point t, the loading information of the display cell $U_4$ is projecting information of the to-be-displayed scene along the path 1". Similarly, at the time-point $t+2\Delta t/3$, with a backlight along the path 3, the display cell $U_4$ emits beam along the path 1", and then being guided to the point $P_r$ along path 1"" by corresponding light-guiding element $L_k$. The beam received by point $P_r$ along path 1"" at time-point $t+2\Delta t/3$ is equivalent to that being emitted from point $U''_4$ of the display screen 10. Point $U''_4$ is the intersection of the path 1"" with the display screen 10. So, at the time-point $t+2\Delta t/3$, the propagating direction of the beam from the display cell $U_4$ and along the path 1" is the projecting path of the display cell $U_4$. So, at the time-point $t+2\Delta t/3$, the loading information of the display cell $U_4$ is projecting information of the to-be-displayed scene along the path 1"". Similarly, at time-point $t+\Delta t/3$, a backlight along the path 2 is activated. Actually, all display cells are processed in this way at different time-points of a time period. Then, it is equivalent that a display cell projects light information from T points of the display screen 10 by such time-multiplexing. During this time-multiplexing process, some display cells may correspond to different light-guiding elements at different time-points of a time period. With a display cell $U_{10}$ of FIG. 10 as example, at two time-points t and $t+\Delta t/3$, corresponding light-guiding element changes from $L_{k+1}$ to $L_k$. So, different backlights may cause change of the display cells being defined to a light-guiding element, which will result in shifting of the generated active-eyebox. From this point of view, according to the real-time position of the pupils, adaptive direction backlight can also be employed for pupil tracking of the generated active-eyeboxes. The display screen 10 can also be attached by a divergence-angle-adjusting device 80, as shown in FIG. 9, to control the divergence angle or propagation direction of the beam from a display cell. For example, a display cell is attached by a micro-nano lens to adjust the divergence angle and outgoing direction of the emitting beam. An array of such micro-nano lenses functions as a divergence-angle-adjusting device 80.

Said backlight unit 70 can be different kinds of optical structures which can provide directional backlights along different directions. The directional backlight can be parallel light, or a bundle of beams being only parallel in one direction. For example, when a lenticular lens is chosen as the light-guiding element, a backlight from the backlight unit 70 may have a parallel state along the arrangement direction of the light-guiding element. But along another direction, the longitudinal direction of the lenticular lens, the divergence angle of a backlight can be unrestricted. Such a backlight is called as a one-dimensional parallel directional backlight. Furthermore, the combination of a parallel backlight and a unidirectional scattering sheet can play a same function as the said one-dimensional parallel directional backlight. The unidirectional scattering sheet can be placed in front of or behind the display screen 10. The directional backlight can also be diverging light, converging light, etc. As long as the backlight for each display cell takes a small divergence angle along at least one direction. The small divergence angle should guarantee that the size of a beam from a display cell is smaller than the interval of adjacent light-guiding element, along the arrangement direction of the light-guiding elements. Here, said size of a beam refers to its light intensity distribution size on the light-guiding elements, with said light intensity being equal to or larger than half of the maximum value.

The directional backlight shown in FIG. 10 can increase the number of projected beams and the display resolution, as discussed above. This effect can also get implemented by the aperture array 60. Under this condition, an aperture corresponding to a light-guiding element is replaced by $S \geq 2$ sub-apertures. The S sub-apertures of each aperture are turned on at S time-points of a time period, respectively. Such sub-apertures are endowed with different temporal orthogonal characteristics. Being activated at different time-points is taken as a kind of temporal orthogonal characteristics in present disclosure. A display cell will project light through different sub-apertures at different time-points of a time period. Thus, display cells of the display device 10 are equivalently taken as different display-cell groups at different time-points of a time period, respectively corresponding to different sub-aperture groups. In this condition, different display-cell groups are constructed by same display cells, but operate at different time-points.

Figure 11:
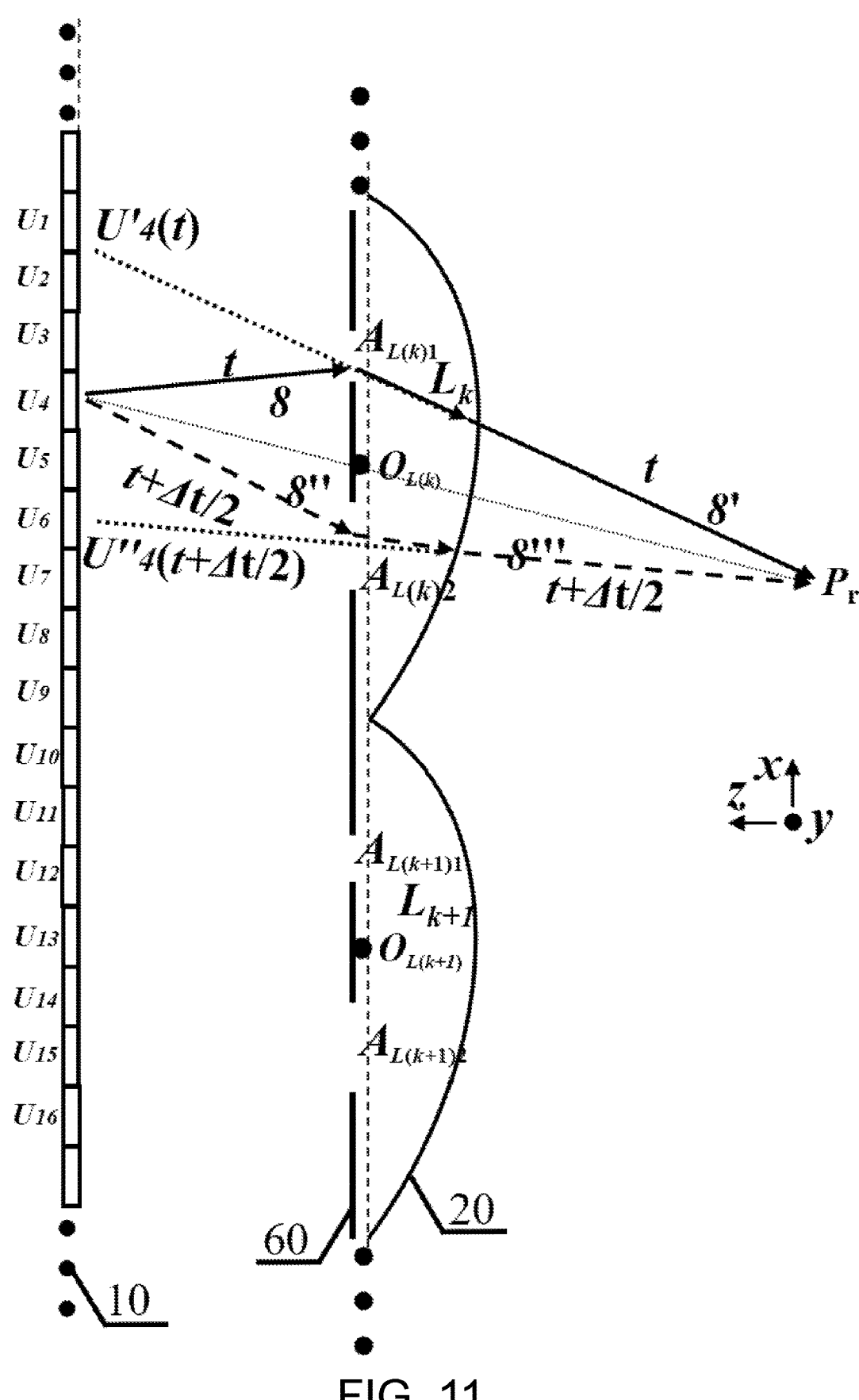
FIG. 11 shows the principle of improving display resolution by sub-apertures.

The light from a display cell will pass through different sub-apertures along different projecting paths. As exampled in FIG. 11, S=2 sub-apertures correspond to a light-guiding element. Concretely, sub-apertures $A_{L(k)1}$ and $A_{L(k)2}$ correspond to a light-guiding element $L_k$, sub-apertures $A_{L(k+1)1}$ and $A_{L(k+1)2}$ correspond to a light-guiding element $L_{k+1}$, and so on. S=2 sub-apertures corresponding to a light-guiding element are turned on at time-points t and $t+\Delta t/2$ of a time period $t\sim t+\Delta t$, respectively. FIG. 11 takes a display cell $U_4$ as example, which corresponds to the light-guiding element $L_k$. At time-point t, the display cell $U_4$ emits a beam along path 8 through corresponding sub-aperture $A_{L(k)1}$ which is turned on at this time-point, and then it is guided to the point $P_r$ by the light-guiding element $L_k$ along the path 8'. Thus, at time-point t, the beam which is received by point $P_r$ and emitted by the display cell $U_4$ is equivalent to that emitting from a point $U'_4$ of the display screen 10. The point $U'_4$ is the intersection of the path 8' with the display screen 10. At this time-point t, loading information of the display cell $U_4$ is the projecting information of the to-be-displayed scene along the path 8'. That is to say, the path 8' is the corresponding projecting path of the display cell $U_4$ at the time-point t. Similarly, at time-point $t+\Delta t/2$, the display cell $U_4$ emits a beam along a path 8" through corresponding sub-aperture $A_{L(k)2}$ which is turned on at this time-point, and then it is guided to the point $P_r$ by the light-guiding element $L_k$ along the path 8'''. At the time-point $t+\Delta t/2$, the beam which is received by point $P_r$ and emitted by the display cell $U_4$ is equivalent to that emitting from a point $U''_4$ of the display screen 10. The point $U''_4$ is the intersection of the path 8''' with the display screen 10. So, the projecting path corresponding to the display cell $U_4$ changes to the path 8''' at time-point $t+\Delta t/2$. All display cells operate similarly. Adjacent sub-apertures are shown with an occlusion region between them in FIG. 11. The adjacent sub-apertures can also be arranged adjoining or even being partially overlapped. In FIG. 11, sub-apertures corresponding to a same light-guiding element are endowed with different temporal orthogonal characteristics. They also can be other orthogonal characteristics, such as polarization orthogonal characteristics, and/or color orthogonal characteristics. Correspondingly, the display cells of the display screen 10 should also be grouped into different display-cell groups, which emit light of said orthogonal characteristics, respectively.

In present disclosure, sub-apertures of an orthogonal characteristic should only let light of corresponding characteristics passing through, and corresponding display-cell group emits light of this corresponding characteristic. Here, take a kind of composite characteristics as example, which is a combination of color orthogonal characteristics and polarization orthogonal characteristics. A conventional RGB display screen 10 is used, three sub-pixels, which emit R, G, B lights respectively, are tiled together as a pixel. Different sub-pixels of a pixel locate at different positions on the display screen 10, functioning as different display cells. A light-guiding element corresponds to S=6 sub-apertures. Three corresponding sub-apertures of each light-guiding element, which respectively only allow R, G, B lights passing through at turn-on state, are turned on at a time-point of a time period. Other three corresponding sub-apertures of each light-guiding element, which also respectively only allow R, G, B lights passing through at turn-on state, are turned on at the other time-point of a time period. The display cells are grouped into 3×2=6 display-cell groups. Concretely, all R display cells (i.e. display cells emitting R light) function as a display-cell group at a time-point t of a time period $t\sim t+\Delta t$, corresponding to the R sub-apertures (i.e. sub-apertures only allowing R light passing through) turned on at the time-point t of a time period $t\sim t+\Delta t$. All G display cells (i.e. display cells emitting G light) function as a display-cell group at a time-point t of a time period $t\sim t+\Delta t$, corresponding to the G sub-apertures (i.e. sub-apertures only allowing G light passing through) turned on at the time-point t of a time period $t\sim t+\Delta t$. All B display cells (i.e. display cells emitting B light) function as a display-cell group at a time-point t of a time period $t\sim t+\Delta t$, corresponding to the B sub-apertures (i.e. sub-apertures only allowing B light passing through) turned on at the time-point t of a time period $t\sim t+\Delta t$. All R display cells function as a display-cell group at a time-point $t+\Delta t/2$ of a time period $t\sim t+\Delta t$, corresponding to the R sub-aperture turned on at the time-point $t+\Delta t/2$ of a time period $t\sim t+\Delta t$. All G display cells function as a display-cell group at a time-point $t+\Delta t/2$ of a time period $t\sim t+\Delta t$, corresponding to the G sub-aperture turned on at the time-point $t+\Delta t/2$ of a time period $t\sim t+\Delta t$. All B display cells function as a display-cell group at a time-point $t+\Delta t/2$ of a time period $t\sim t+\Delta t$, corresponding to the B sub-aperture turned on at the time-point $t+\Delta t/2$ of a time period $t\sim t+\Delta t$. Thus, at two time-points of a time period, 6 display-cell groups work in active-eyebox projecting, respectively.

Additionally, a sub-aperture can also have a phase modulation capability, for adjusting the outgoing direction or divergence angle of the exit light. For example, a liquid-crystal sub-aperture can simultaneously work as a phase plate. The phase plate can be endowed with the function of a prism, or a lens, or both of them, under the control of the control unit 30. Or, a sub-aperture is filled by an optical prism, or an optical lens. A display cell may be a structure emitting color light, such as a stacked structure consisting of R light emitting layer, G light emitting layer, and B light emitting layer, or an aperture with R, G, B lights incoming sequentially as backlight. Under this condition, when color orthogonal characteristics are endowed to the sub-apertures, the R light, G light, and B light from a same display cell will pass through corresponding R sub-aperture, G sub-aperture, and B sub-aperture, respectively. Thus, a display cell will correspond to multiple projecting paths and multiple display-cell viewpoints in this case. The aperture array 40 and the eyebox-generating device 20 also may be implemented by one physical device, such as a liquid crystal device.

In the above embodiments, O≥2 orthogonal characteristics can also be endowed to adjacent O light-guiding elements, respectively. Light-guiding elements of same orthogonal characteristics form a light-guiding element cluster. There will exist O light-guiding element clusters. The display cells of display screen 10 are grouped into O display-cell clusters, correspondingly. The (display-cell clusters correspond to the (light-guiding element clusters in a one-to-one manner. A display-cell cluster is configured to only project light of the orthogonal characteristic same to corresponding light-guiding element cluster. Thus, a light-guiding element cluster only allows light from corresponding display-cell cluster passing through, blocking the light from non-corresponding display-cell clusters. Or a display-cell cluster only allows light from corresponding light-guiding element passing through, blocking the light from non-corresponding light-guiding elements. The term 'blocking' does not mean 100% blocking practically, but refers to the case that un-blocked light, as crosstalk noise, is negligible or sufferable by the display quality. A display-cell cluster and corresponding light-guiding element cluster construct up a sub-display system. Then, the O sub-display systems can implement active-eyebox projecting independently, as discussed above. Said orthogonal characteristics in present disclosure mean the characteristics which can identify each other. Light-guiding elements of a cluster should only let light of corresponding characteristics passing through. That is to say, light-guiding elements of a cluster should only let light from corresponding display-cell cluster passing through. Similar to above discussed orthogonal characteristics of the sub-apertures, said orthogonal characteristics include, but not limited to, temporal orthogonal characteristics, color orthogonal characteristics, polarization orthogonal characteristics. Among them, the temporal orthogonal characteristics of the light-guiding element clusters can be implemented by attaching a controllable aperture to each light-guiding element, such as a liquid-crystal aperture.

Color orthogonal characteristics are exampled here when a conventional RGB display screen 10 is employed. Three sub-pixels, which emit R, G, B lights respectively, are tiled as a pixel. Different sub-pixels of a pixel locate at different positions on the display screen 10, functioning as different display cells of different colors (R, G, or B). O=3 light-guiding element clusters are configured to only allow R, G, and B lights passing through, respectively, by attaching corresponding color filter to each light-guiding element. Thus, R display cells and light-guiding elements allowing R light passing through constitute a sub-display system of R characteristic, G display cells and light-guiding elements allowing G light passing through constitute a sub-display system of G characteristic, B display cells and light-guiding elements allowing B light passing through constitute a sub-display system of B characteristic. They implement active-eyeboxes projecting, respectively. Obviously, display screen 10 with sub-pixels of more kinds of colors will leads to more sub-display systems.

A display cell may also take a structure emitting color light, for example, emitting R light, G light, and B light under the control of the control unit 30. Under this condition, when color orthogonal characteristics are endowed to adjacent light-guiding elements, the display-cell cluster corresponding to a light-guiding element cluster is constructed by corresponding partial structure of each display cell. Said corresponding partial structure refers to a partial structure of a display cell which emits light of corresponding color. Under this condition, a display cell emitting color light will correspond to multiple projecting paths and display-cell viewpoints.

The polarization orthogonal characteristics can get implemented by attaching corresponding polarizer to each light-guiding element. Or, the light-guiding element is a Metasurface element, which is configured to allow only corresponding polarized light passing through. For example, O=2 adjacent light-guiding elements allow left polarized light and right polarized light passing through, respectively. The display cells 10 are divided into two display-cell clusters, which are respectively configured to emit left polarized light and right polarized light. Thus, two sub-display systems get formed. The polarization orthogonality characteristic can also take two linear polarization states, with two polarization direction perpendicular to each other.

Above-mentioned designs of orthogonal characteristics, directional backlights, sub-apertures, and tunable eyebox-generating device, are all applicable to the case of n=0. These designs benefit increasing the display resolution or/and the viewpoint number.

A lenticular lens is exampled as a light-guiding element in above process. It can also be a one-dimensional slit grating with its slits functioning as light-guiding elements, or a two-dimensional lens grating with its lenses functioning as light-guiding elements, or a two-dimensional aperture grating with its apertures functioning as light-guiding elements, or a one-dimensional micro-nano structure array with its micro-nano structures functioning as light-guiding elements, or a two-dimensional micro-nano structure array with its micro-nano structures functioning as light-guiding elements. Among them, said micro-nano structure consists of micro-nano components, attached to the display cells in a one-to-one manner. A micro-nano component, such as a Metasurface, guides beam from corresponding display cell to corresponding eyebox. Said eyebox refers to a relay-eyebox or an active-eyebox in present disclosure.

The two-dimensional structure eyebox-generating device 20 is the dimension extension of the one-dimensional structure eyebox-generating device. For example, taking a two-dimensional lens array as the eyebox-generating device 20, the generated active-eyeboxes will be arranged along two dimensions. Along each of the two dimensions, the method of generating active-eyeboxes is similar to the embodiments discussed above. The active-eyeboxes along different dimensions may take different characteristics, such as different viewpoint density, or/and different intervals between adjacent active-eyeboxes. Said light-guiding element may be traditional optical components, or new-type components, such as a Metasurface, or a holographic element.

Figure 12:
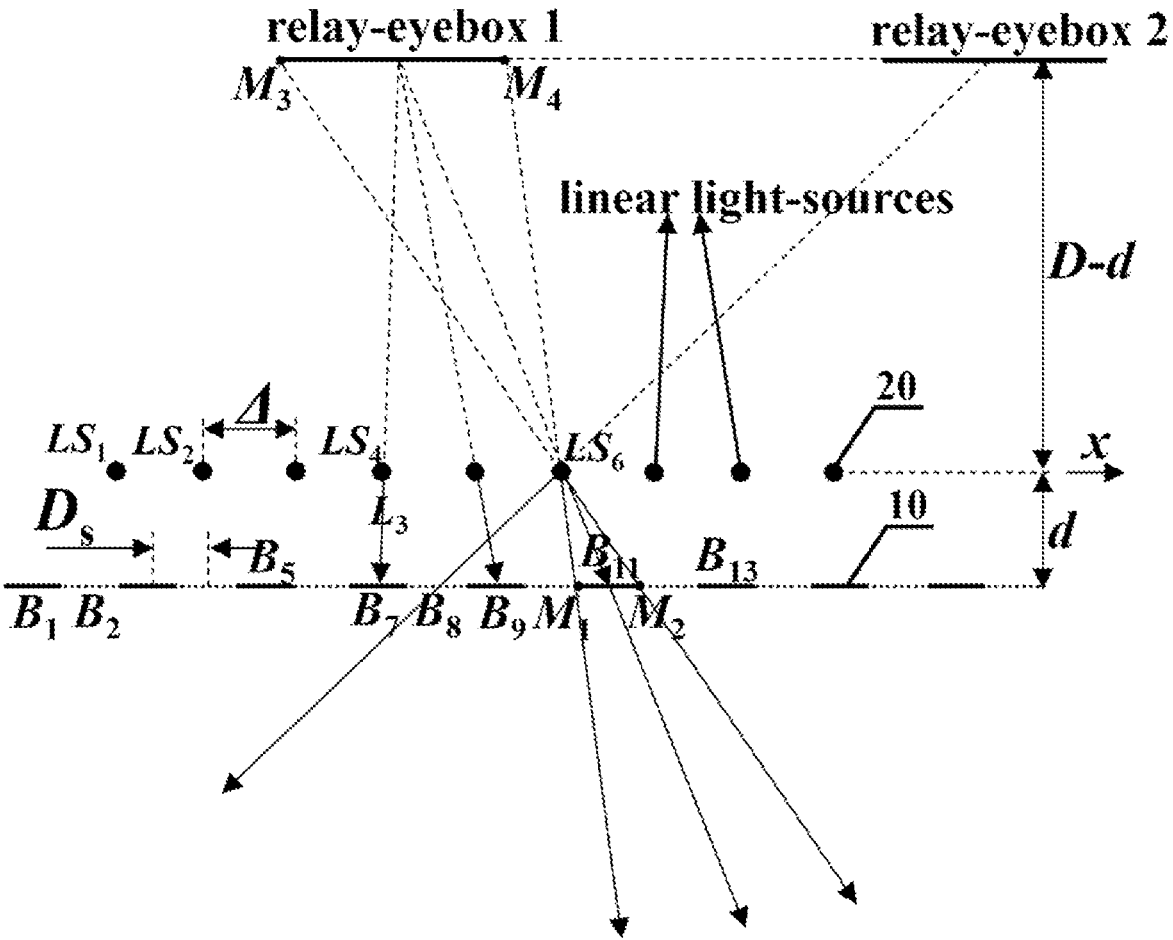
FIG. 12 is a display system with line-light-sources as light-guiding elements.

The eyebox-generating device 20 can also be a one-dimensional line-light-source array with its line-light-sources functioning as light-guiding elements, or a two-dimensional point-light-source array with its point-light-sources functioning as light-guiding elements. The eyebox-generating device 20 shown in FIG. 12 takes a line-light-source as a light-guiding element. Specifically, along the x-axis, the display cells of display screen 10 are divided into display-cell blocks: $B_1$, $B_2$, $B_3$, $B_4$, $B_5$, . . . . In FIG. 12, line-light-sources $LS_1$, $LS_2$, $LS_3$, $LS_4$, $LS_5$ . . . are taken as the light-guiding elements. The display screen 10 is placed in front of the eyebox-generating device 20 at a distance d along the propagating direction of the light. Along the x-direction, a light-guiding element corresponds to $N_b \geq 2$ display-cell blocks, and the display-cell blocks corresponding to a same light-guiding element are spaced by $(n \times N_b)$ display-cell blocks. Along the x direction, display-cell blocks spaced by $(N_b-1)$ display-cell blocks take light from respectively corresponding line-light-sources as backlight. The reverse extension lines of beams from these display-cell blocks gather into a relay-eyebox. D is the distance between the relay-eyeboxes and the display screen 10. $N_b$ relay-eyeboxes are generated. FIG. 12 takes $N_b=2$ and n=1 as examples. A light-guiding element corresponds to $N_b=2$ display-cell blocks, and the display-cell blocks corresponding to a same light-guiding element are spaced by $(n \times N_b)=2$ display-cell blocks. Concretely, display-cell blocks $B_{11}$ and $B_8$ corresponding to the light-guiding element $LS_6$ are spaced by 2 display-cell blocks $B_{10}$ and $B_9$. The reverse extension lines of the beams from the display-cell block $B_{11}$ cover the relay-eyebox 1. As shown in FIG. 12, the line connecting $SL_6$ and the edge points $M_1$ and $M_2$ of a corresponding display-cell block $B_{11}$ intersects with corresponding relay-eyebox 1 at the edge points $M_3$ and $M_4$. Similarly, the display-cell blocks . . . , $B_7$, $B_9$, $B_{11}$ . . . receive backlight from corresponding light-guiding elements . . . , $LS_4$, $LS_5$, $LS_6$ . . . , respectively. The reverse extension lines of the beams emitted by these display-cell blocks cover the relay-eyebox 1 together. In FIG. 12, $\Delta$ represents the interval between adjacent light-guiding elements. The interval between adjacent display-cell blocks can be denoted by:

$$D_s = D \times \Delta/(N_b \times (D - d)) = D_{s-s}/N_b. \qquad (6)$$

Here, $D_{s-s}$ is the size occupied by $N_b$ adjacent display-cell blocks along the x-axis. When D has a finite value, $N_b \times D_s < \Delta$. When D has an infinite value, $N_b \times D_s = \Delta$.

The one-dimensional line-light-source array can also change its function parameters under the control of the control unit 30. The function parameters include but not limited to the position, interval, and arrangement direction of the line-light-sources. At different time-points of a time period, the one-dimensional line-light-source array can present different function parameters sequentially. Or, according to the real-time position of the pupils, the function parameter of the one-dimensional line-light-source array can be adjusted correspondingly to make generated active-eyeboxes keep tracking the pupils. Actually, densely arranged line-light-sources can be designed, and different combinations of the one-dimensional line-light-sources function as different function parameters. Rotating of the densely arranged line-light-sources can change the arrangement direction of the line-light-sources.

The one-dimensional line-light-source array also can be changed into an invalid state for implementing 2D display. At the invalid state, the light from a one-dimensional line-light-source is no longer directional light. For example, said non-directional state can be realized by activating a liquid-crystal scattering film attached to the display screen 10, for destroying the directivity of the light from the one-dimensional line-light-source array.

Similar to the sub-apertures shown in FIG. 11, each one-dimensional line-light-source can also be replaced by S≥2 sub-line-light-sources, which respectively project light of S kinds of orthogonal characteristics. Accordingly, the display cells are divided into S display-cell groups in a one-to-one manner. A display-cell group is configured to only allow light from corresponding sub-line-light-source passing through.

When eyebox-generating device 20 of one-dimensional structure is used, such as a one-dimensional lenticular grating or a one-dimensional line-light-source array, guided beam from a display cell often has a strip-shaped light distribution in corresponding eyebox. That is to say, the display-cell point is actually a strip-shaped light distribution zone.

Figures 13A, 13B:
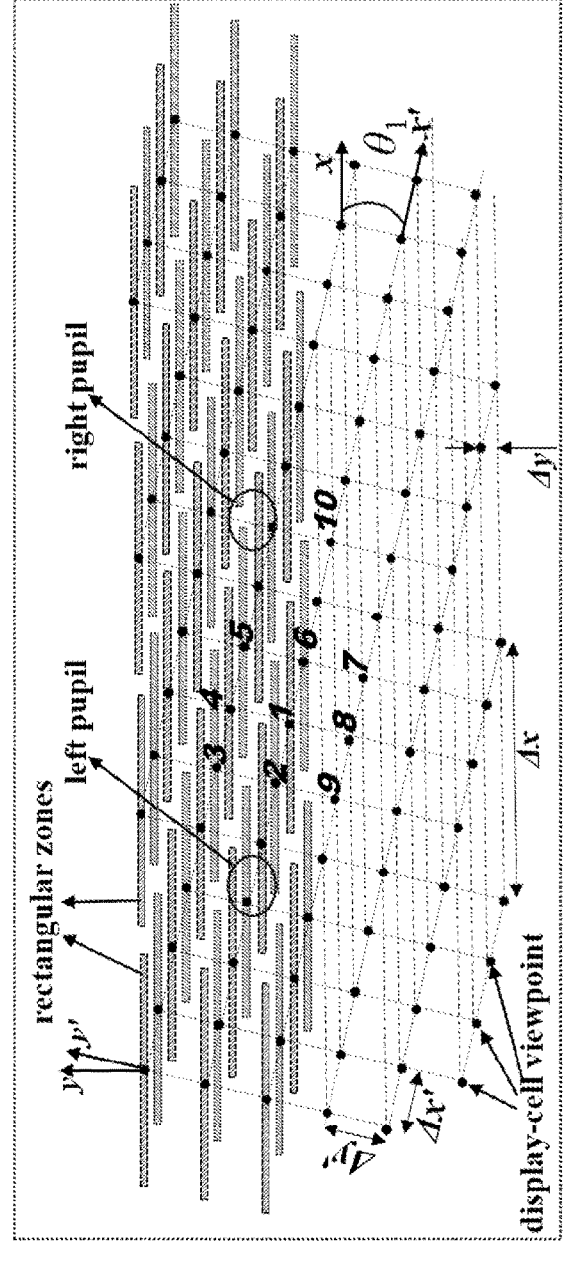
FIG. 13A and FIG. 13B show light distribution of beams after scattered by a unidirectional scattering sheet.

With eyebox-generating device 20 of two-dimensional structure, such as a two-dimensional lens grating or a two-dimensional point-light-source array, guided beam from a display cell often has a dot-like light distribution in corresponding eyebox. Such dot-like display-cell viewpoints are two-dimensionally arranged, as shown in FIG. 13A and FIG. 13B. The dot-like display-cell viewpoints shown in FIG. 13A and FIG. 13B (such as dot-like display-cell viewpoints . . . , 1, 2, 3, 4, 5, 6 . . . ) correspond to display cells of a display-cell block, and are arranged along x' and y' directions. Attach a unidirectional scattering sheet to the composite structure of the display screen 10 and the eyebox-generating device 20, the scattered light distribution of the light from a display cell will change into a strip-shaped zone as shown in FIG. 13A, or a rectangular zone as shown in FIG. 13B. The long direction of a strip-shaped zone of FIG. 13A is configured along x direction. The long direction of a rectangular zone of FIG. 13B is shown along y direction. An included angle $\theta_1$ between the x direction and the x' direction is configured in FIG. 13A, to guarantee that rectangular zones shown in FIG. 13A with an interval smaller than pupil diameters along the y direction, an interval smaller than binocular interval along the x direction. An included angle $\theta_2$ between the x direction and the x' direction is configured in FIG. 13B, to guarantee that strip-shaped zones shown in FIG. 12 (*b*) with an interval smaller than pupil diameters along the x direction. In FIG. 13A and FIG. 13B, the x direction is often, but not necessary, taken as the connection direction of a viewer's pupils.

The design of strip-shaped zones or rectangular zones of FIG. 13A and FIG. 13B by a unidirectional scattering sheet is also applicable to display system with dot-like display-cell viewpoints generated by other types of eyebox-generating devices.

All focal-length-related optical components (optical element or optical device) discussed above, can be configured being sensitive to light characteristics. Said "sensitive" refers to that the optical component has different focal lengths to light of different characteristics. In this case, the orthogonal characteristics discussed above, or new characteristics, can be taken as the sensitive characteristics. Then, display cells emitting light of different sensitive characteristics may be projected to different depth positions. Or, endow different sensitive characteristics to all the display cells at different time-points of a time period. Thus, the display screen 10 may be projected to different depth positions at different time-points of a time period. For example, when the lenticular lenses of a one-dimensional lenticular grating (as an eyebox-generating device), or lenses of two-dimensional lens grating (as an eyebox-generating device), or projecting unit 50, are implemented by metasurfcce structures, they can be configured to have different focal lengths to light of different polarization states. The projecting unit 50 can also be driven by the control unit 30 to present different focal lengths. For example, a liquid crystal lens can be used as the projecting unit 50, to project the display screen 10 to different depths under different driving voltages. The different focal lengths of an optical component may appear sequentially, or an adaptive focal length is activated for guaranteeing that to-be-displayed scenes are around the gazing depth.

Embodiment 2

Figure 14:
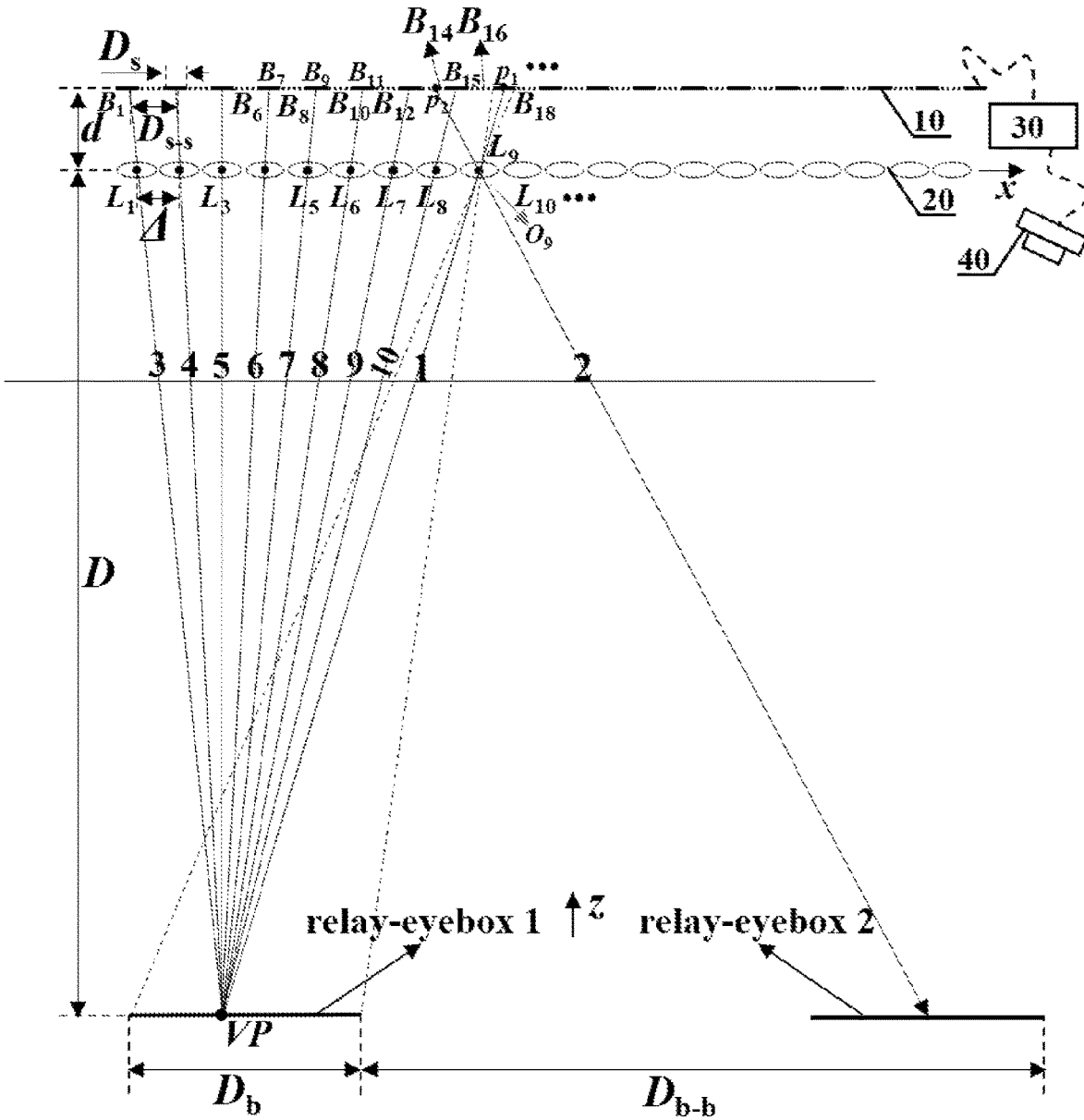
FIG. 14 shows a schematic diagram of a display system without projecting unit.

FIG. 14 shows a basic optical structure of another dense-viewpoint 3D display, which also includes a display screen 10, an eyebox-generating device 20, a control unit 30, and a tracking unit 40. A relay-eyebox of such display system is a gathering zone of beams from corresponding display cells, called as a real relay-eyeboxe. The display screen 10 consists of display cells, which can display light information under the control of the control unit 30. A display cell in present disclosure refers to a smallest surface structure that can project light independently. For example, surface arranged monochromatic sub-pixels of a conventional display screen can be directly taken as said display cells. A stacked structure of multiple luminous units may also be taken as a display cell, such as a stacked structure consisting of three layers. Here, for example, said three layers emitting R (red) light, G (green) light, and B (blue) light, respectively. Or, an aperture with sequential backlights of different colors can function as a display cell. Actually, an indivisible surface structure, whether it emits monochromatic light or chromatic light, may be taken as a display cell.

Figure 15:
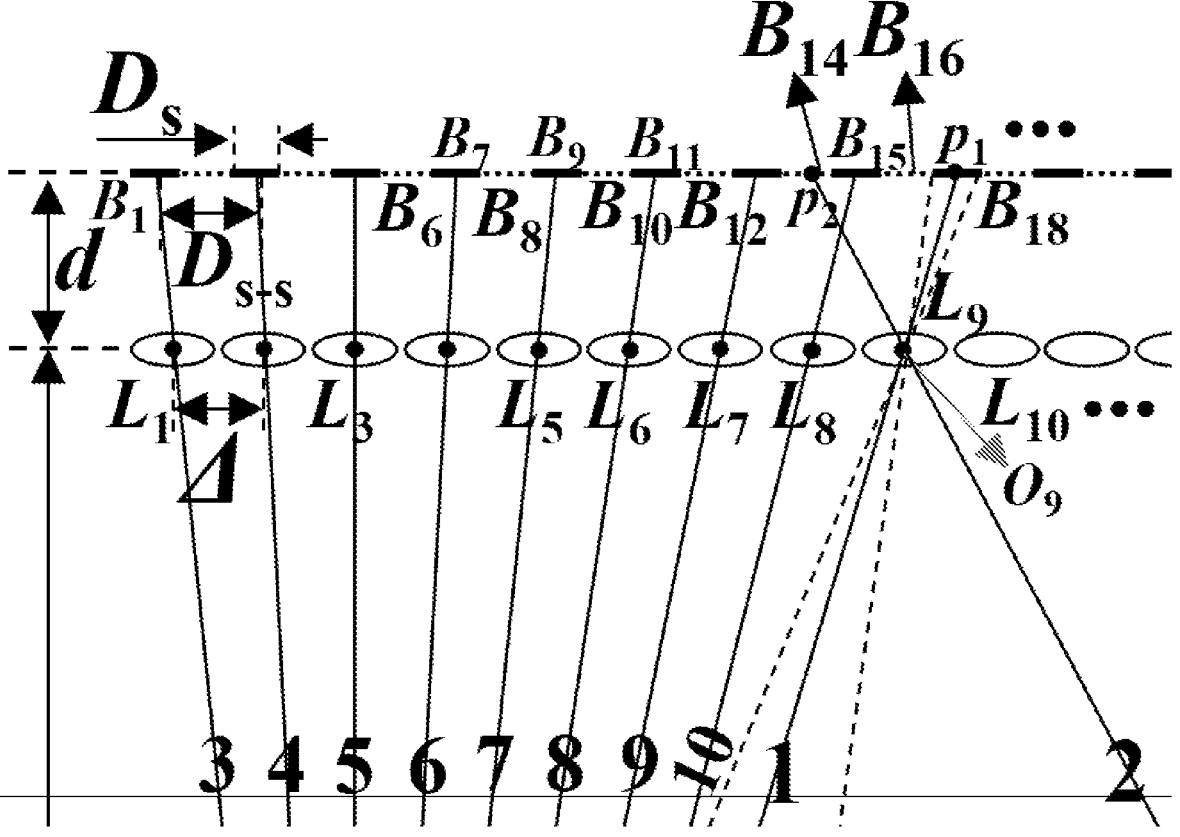
FIG. 15 is an enlarged view of partial zone of FIG. 14.

All the display cells are grouped into multiple display-cell blocks along at least one direction, and each display-cell block contains multiple display cells. In FIG. 14, along the x-axis, the display cells of the display screen 10 are grouped into display-cell blocks: $B_1$, $B_2$, $B_3$, $B_4$, $B_5$, . . . . In FIG. 14, a one-dimensional lenticular grating is exampled as the eyebox-generating device 20, with a lenticular lens functioning as a light-guiding element. The eyebox-generating device 20 is placed in front of the display screen 10, with a distance d along the light propagation direction. Light-guiding elements $L_1$, $L_2$, $L_3$, $L_4$, $L_5$ . . . of the eyebox-generating device 20 are arranged along the x-axis. Along the x-direction, each light-guiding element corresponds to $N_b \geq 2$ display-cell blocks, and the display-cell blocks corresponding to a same light-guiding element are spaced by $(n \times N_b)$ display-cell blocks. Here, the integer $n \geq 0$. Beams from all display-cell blocks spaced by $(N_b-1)$ display-cell block(s) are guided to a same relay-eyebox. The distance between the display screen 10 and the relay-eyeboxes is denoted as d+D. Totally $N_b$ relay-eyeboxes get presented, especially with $n \geq 1$ corresponding to discretely distributed relay-eyeboxes. FIG. 14 takes $N_b=2$ and n=1 as examples. Under this condition, a light-guiding element corresponds to $N_b=2$ display-cell blocks, which are spaced by $(n \times N_b)=2$ display-cell blocks. Concretely, $N_b=2$ display-cell blocks, $B_{14}$ and $B_{17}$, correspond to a light-guiding element $L_9$. They are spaced by $(n \times N_b)=2$ display-cell blocks Bis and $B_{16}$, as shown in FIG. 15. FIG. 15 is a partial enlargement of FIG. 14. A display-cell block projects beams through corresponding light-guiding element, and these beams cover the corresponding relay-eyebox. For example, after passing through the corresponding light-guiding element $L_9$, beams from the display-cell block $B_{17}$ are gathered to corresponding virtual relay-eyebox 1. In FIG. 14, point $O_9$ is an optical center of the light-guiding element $L_9$. As shown in FIG. 14, the lines, connecting the point $O_9$ and edge points of the display-cell block $B_{17}$, intersect with the relay-eyebox 1 at its edge points. Similarly, the display-cell blocks . . . , $B_3$, $B_5$, $B_7$, $B_9$, $B_{11}$, $B_{13}$, $B_{15}$ . . . project beams through respectively corresponding light-guiding elements . . . , $L_2$, $L_3$, $L_4$, $L_5$, $L_6$, $L_7$, $L_8$ . . . . Together, these beams form the real relay-eyebox 1. In FIG. 1, $\Delta$ denotes the interval between adjacent light-guiding elements. According to the geometrical relationship shown in FIG. 14, the interval between adjacent display-cell blocks $D_s$ is denoted as:

$$D_s = (D + d) \times \Delta/(N_b \times D) = D_{s-s}/N_b. \qquad (7)$$

Wherein, $D_{s-s}$ is the size occupied by $N_b$ adjacent display-cell blocks. When D is a finite value, $\Delta < D_{s-s}$ in the Eq. (7).

Simultaneously, the display-cell blocks . . . , $B_8$, $B_{10}$, $B_{12}$, $B_{14}$, $B_{16}$, $B_{18}$ . . . project beams through respectively corresponding light-guiding elements . . . , $L_6$, $L_7$, $L_8$, $L_9$, $L_{10}$, $L_{11}$ . . . . These beams form the relay-eyebox 2, as shown in FIG. 14. In FIG. 14, only partial display-cell blocks are marked for clarity. The serial numbers of other display-cell blocks are obvious according to their sequence arrangement.

As mentioned above, the eyebox-generating device 20 has an eyebox generating function: a light-guiding element corresponds to $N_b$ display-cell blocks spaced by $(n \times N_b)$ display-cell blocks; and beams (or their reverse extension lines) from $N_b$ corresponding display-cell blocks are guided to $N_b$ relay-eyeboxes in a one-to-one manner by a light-guiding element. During this process, the display-cell blocks spaced by $(N_b-1)$ display-cell blocks correspond to a same relay-eyebox.

In FIG. 14, a display cell corresponds to a special projecting path. Concretely, a projecting path corresponding to a display cell is the propagation path of a beam which comes from this display cell and incidents into corresponding relay-eyebox. That is to say, different display cells correspond to different projecting paths. Thus, a display cell corresponds to a viewpoint, which may also be called as a display-cell viewpoint. A display-cell viewpoint is the intersection point of the projecting path corresponding to this display cell with the relay-eyebox corresponding to this display cell.

A display screen 10, whose pixel consists of multiple surface arranged sub-pixels of different colors, is often used in the display field. The sub-pixels of such a pixel occupy different locations on the display screen 10. In traditional 3D display, a pixel is designed to project a color beam along a corresponding projecting path to a viewpoint. That is, subpixels of such a pixel correspond to a common projecting path and a common viewpoint. However, in present disclosure, sub-pixels of such a pixel correspond to different projecting paths with a sub-pixel functioning as a display cell. Sub-pixels of a pixel correspond to different viewpoints. So, the design of display cells will bring more viewpoints.

A point in a relay-eyebox, such as a point VP in the relay-eyebox 1, is taken as a view viewpoint when it satisfies following characteristics. A view viewpoint is an overlapping point of multiple display-cell viewpoints. The display cells corresponding to these overlapped display-cell viewpoints comprise at least one display cell from each corresponding display-cell block. Here, said "each corresponding display-cell block" refers to each display-cell block corresponding to the relay-eyebox containing this view viewpoint.

Control unit 30 drives the display screen 10 to load light information. The loaded information of a display cell takes the projection information of the to-be-displayed scene along corresponding projection path. Thus, at a view viewpoint VP, a 2D perspective view will be perceived. If beams from each display-cell block are all guided to different view viewpoints and the interval between adjacent view viewpoints is smaller than pupil diameter $D_p$, a VAC-free SMV 3D display will get implemented. Obviously, a point in a relay-eyebox, such as the point VP in the relay-eyebox 1, may be a view viewpoint, or not. For each display point, as long as there are at least two passing-through beams to be perceived by each pupil around a relay-eyebox, a VAC-free SMV 3D display is reachable. Present disclosure takes VAC-free 3D display as our goal, based on the setting of "a display cell corresponds to a special projecting path" and "different display cells correspond to different projecting paths". For a display point, when only one passing-through beam is guided to each pupil in proposed display system, a 3D display can also get implemented based on conventional stereoscopic technology, especially when a display cell can emit color light.

Actually, the beam from a display cell will have a divergence angle, even has been modulated by corresponding light-guiding element. The projecting path corresponding to a display cell often takes a ray of the beam coming from this display cell and guided to corresponding relay-eyebox, by corresponding light-guiding element.

According to the geometric relationship shown in FIG. 1, the eyebox size $D_b$ is determined by:

$$D_6 = D_s \times D/d = (D+d) \times \Delta/(N_b \times d), \qquad (8)$$

Distance between adjacent eyeboxes is:

$$D_{b-b} = (n \times N_b + 1) \times D_b. \qquad (9)$$

When two pupils of a viewer are covered by two active-eyeboxes, following equations should be satisfied:

$$D_b \geq D_p, \qquad (10)$$

$$\text{and, } D_{e-e} - D_b < D_{b-b} < D_{e-e} + D_b. \qquad (11)$$

Here, $D_p$ denotes the diameter of a pupil. Two pupils of a viewer can also be covered by only an active-eyebox, with different active-eyeboxes being designed for different viewers. In this case, $D_b > D_{e-e}$ is necessary.

FIG. 14 takes n=1 as example. It is noteworthy that n=0 corresponds to a special case: $N_b$ relay-eyeboxes will appear seamlessly and connect together into a continuous observing region. All optical structures and display methods proposed by present disclosure, including those discussed in following sections, are applicable to the case of n=0.

FIG. 14 is exampled with $N_b$=2. A larger $N_b$ will generate more relay-eyeboxes. During displaying, light from non-corresponding display cells may pass through a light-guiding element as crosstalk noise. A viewer's pupil may also be placed with some distance from the relay-eyeboxes.

To implement 3D display by said display system, following steps are required. Firstly, according to the position that the viewer frequently appears, define the display cells corresponding to each light-guiding element. The control unit 30 refreshes all display cells by corresponding projection information under driven of the control unit 30, for projecting corresponding relay-eyeboxes. Then, when necessary, such as when generated relay-eyeboxes can no longer cover the viewer's pupils, the generated relay-eyeboxes should be configured to keep tracking the pupils. According to the real-time positions of the pupils detected by the tracking unit 40, re-defining display cells corresponding to each light-guiding element, or/and adjusting function parameter(s) of said eyebox-generating device (20), or/and activating back-light along an adaptive direction, to make newly generated relay-eyeboxes keep tracking the pupils dynamically. This is similar to that has discussed in the Embodiment 1. In this process, the display screen 10 is refreshed synchronously. Repeat these steps to implement 3D display.

Obviously, when the generated active-eyeboxes can cover the whole observing region, the tracking unit 40 is no longer needed. This is especially suitable for the case of n=0.

An application scenario is taking the proposed display system as a portable device. The viewer may hold it vertically or horizontally. These two states may need rotating the one-dimensional lenticular grating correspondingly to change the arrangement direction of generated relay-eyeboxes correspondingly. Furthermore, if the arrangement direction of the generated relay-eyeboxes is inclined to both the vertical direction and the horizontal direction, without changing the arrangement direction of generated relay-eyeboxes (relative to the display screen), the generated relay-eyeboxes may directly cover the viewer's pupils at these two states. This can also be illustrated by FIG. 7A and FIG. 7B, with "active-eyebox" marked in FIG. 7A and FIG. 7B being replaced by "relay-eyebox". With one-dimensional lenticular grating, light distribution from a display cell has a strip-shaped shape, which is denoted by a line in FIG. 7A and FIG. 7B. Lines 1, 2, 3, 4, 5 denote light distributions from different display cells of a display-cell block, lines 6, 7, 8, 9, 10 denote light distributions from different display cells of another display-cell block. With such strip-shaped light from a display cell, tracking unit 40 is often needed to further restrict the projection path of a display cell to be "the propagation path of a beam which comes from this display cell and incidents into corresponding pupil" when necessary. Thus, according to the real-time position of a pupil, the display cells should get refreshed synchronously with corresponding projection paths. Of course, in FIG. 7A and FIG. 7B, the generated relay-eyeboxes can take further location displacement as discussed above in Embodiment 1. The rotating shown by FIG. 7A and FIG. 7B is also applicable to the case of n=0.

When a light-guiding element has a focal length or an equivalent focal length, the focal length of the light-guiding elements can be adjusted under the control of the control unit 30 to change the waist position of a beam from a display cell.

In proposed disclosure, when a light-guiding element has a focal length or an equivalent focal length, display cells often locate at corresponding focal plane. They may also locate at a distance away from said focal plane.

When an eyebox-generating device of a one-dimensional structure is used, such as a one-dimensional lenticular grating, the light distribution of a beam on the plane of the relay-eyebox has a strip-shaped shape. Under this condition, the projecting path corresponding to a display cell optimally takes the propagation path of a beam which comes from this display cell and incidents into corresponding pupil. Under this condition, the tracking unit 30 is often needed.

The eyebox-generating device 20 can also be a stacked structure consisting of more than one layers, similar to the situation discussed in Embodiment 1. The eyebox-generating device 20 can also be a tunable device, similar to the situation discussed in Embodiment 1.

In summary, similar to the situation discussed in Embodiment 1, there exist different methods for implementing pupil tracking by the generated active-eyeboxes. Change the function parameters of the eyebox-generating device 20, or re-define display cells to each light-guiding element, or both of them. The eyebox-generating device 20 may also be invalidated for implementing 2D display. For example, an eyebox-generating device 20 based on liquid-crystal device can be converted into a two-dimensional liquid crystal panel with uniform refractive index.

When a light-guiding element has a focal length or an equivalent focal length, the focal length of the light-guiding elements can be adjusted under the control of the control unit 30 to change the waist position of a beam from a display cell. All focal-length-related optical components (optical element or optical device) can be configured being sensitive to light characteristics, as discussed in Embodiment 1.

In FIG. 14, the arrangement direction of the display cells and that of the light-guiding elements may take an inclination angle, as shown in FIG. 8. In FIG. 8, a display cell is shown with a square shape. The display cell can also take other shapes, such as a rectangular shape. The display cells shown in FIG. 8 are arranged along two mutually perpendicular directions. These two directions also may be non-perpendicular to each other. Present disclosure does not impose any restrictions on arrangement of the display cells.

The display system of FIG. 14 implements display without a projecting unit 50. When needed, a projecting unit 50 can be further inserted into FIG. 14. Under this condition, the real relay-eyeboxes are imaged to corresponding active-eyeboxes, as shown in FIG. 5A. The 3D display gets implemented similarly to Embodiment 1, under following premise. The projecting path corresponding to a display cell is the propagation path of a beam which comes from this display cell and incidents into corresponding active-eyebox or a pupil around corresponding active-eyeboxes.

The display cell of present disclosure refers to a smallest surface structure that can emit light independently. Conventional display screens often take surface arranged multiple sub-pixels to be tiled together as a pixel. Here, take a common RGB display panel as example. The common RGB display panel takes three sub-pixels as a pixel, with these three sub-pixels of a pixel being arranged on the surface of the display panel. These three sub-pixels emit red (R), green (G), and blue (B) light, respectively. In conventional display, a pixel is taken as a display unit which emits a color beam, which is called as pixel-design. Thus, different sub-pixels of a pixel correspond to one common projecting path and one common viewpoint. That is to say, different sub-pixels of a pixel correspond to one projected beam, also this projected beam composes of three color components. In present disclosure, three sub-pixels of such a pixel are taken as three independent display cells. They correspond to different projecting paths and they optimally correspond to different viewpoints. This strategy is called as display-cell-design. Said "they correspond to different projecting paths" means that three sub-pixels of such a pixel respectively correspond to three beams. So, under the same condition, comparing to conventional pixel-design, display-cell-design of present disclosure can increase the number of projected beams and the number of viewpoints. This kind of gain is extremely beneficial for VAC-free SMV 3D display, which needs more projected beams for re-building spatial light points. It should be noted that when a sub-pixel emits monochrome light, the optical information loaded to this sub-pixel is only corresponding color component.

The dense-viewpoint 3D display system of present disclosure can further include an aperture array 60. The aperture array 60 consists of apertures, as shown in FIG. 9. Said apertures correspond to the light-guiding elements in a one-to-one manner, for adjusting the clear aperture size of each light-guiding element. For example, a liquid-crystal light valve array can be taken as an aperture array 60, with light valves functioning as the apertures. The size of such a light valve can be adjusted under the control of the control unit 30. Some optical medium may be filled into the space between the display screen 10 and the eyebox-generating device 20, such as optical adhesive.

The display screen 10 may be different kinds of display devices, such as micro-LED screen, OLED screen, LCD screen, etc. Present disclosure does not impose any restrictions on the types of the display screen and on the layout method of its display cells. For example, the display screen 10 may also be a curved screen.

The display screen 10 may also be a static display device, for example a nanoimprint plate. A nanoimprint unit of said nanoimprint plate functions as a display cell.

When a backlit display screen 10 is chosen, a backlight unit 70 may provide directional backlights along T>1 directions, to increase the number of projected beams and the display resolution, or to activate adaptive direction backlight for pupil tracking. This is similar to the discussion around FIG. 10 of above Embodiment 1. The display cell may be a structure emitting color light, such as a stacked structure consisting of R light emitting layer, G light emitting layer, and B light emitting layer, or an aperture with R, G, B lights incoming sequentially as backlight. Under this condition, when directional backlights come in along different directions, a display cell will correspond to multiple projecting paths and multiple display-cell viewpoints in this case.

Furthermore, sub-apertures of different orthogonal characteristics can also be configured to each light-guiding element, similar to the discussion around FIG. 11 of above Embodiment 1. The display cell may be a structure emitting color light, such as a stacked structure consisting of R light emitting layer, G light emitting layer, and B light emitting layer, or an aperture with R, G, B lights incoming sequentially as backlight. Under this condition, when color orthogonal characteristics are endowed to the sub-apertures, the R light, G light, and B light from a same display cell will pass through corresponding R sub-aperture, G sub-aperture, and B sub-aperture, respectively. Thus, a display cell will correspond to multiple projecting paths and multiple display-cell viewpoints in this case.

A lenticular lens is exampled as a light-guiding element in above process. It can also be a one-dimensional slit grating with a slit functioning as a light-guiding element, or a two-dimensional lens grating with a lens functioning as a light-guiding element, or a two-dimensional aperture grating with an aperture functioning as a light-guiding element, or a one-dimensional micro-nano structure array with a micro-nano structure functioning as a light-guiding element, or a two-dimensional micro-nano structure array with a micro-nano structure functioning as a light-guiding element. Among them, said micro-nano structure consists of micro-nano components, attached to the display cells in a one-to-one manner. A micro-nano component, such as a Metasurface, guides beam from corresponding display cell to corresponding eyebox. Said eyebox refers to a relay-eyebox or an active-eyebox in present disclosure.

The said two-dimensional structure eyebox-generating device 20 is the dimension extension of the one-dimensional structure eyebox-generating device. For example, taking a two-dimensional lens array as the eyebox-generating device 20, generated relay-eyeboxes or active-eyeboxes will be arranged along two dimensions. Along each of the two dimensions, the method of generating relay-eyeboxes or active-eyeboxes is similar to the embodiments discussed above. The relay-eyeboxes or active-eyeboxes along different dimensions may take different characteristics, such as different viewpoint density, or/and different intervals between adjacent relay-eyeboxes or active-eyeboxes. Said light-guiding element may be traditional optical components, or new-type components, such as a Metasurface, or a holographic element.

Similar to FIG. 12, a one-dimensional line-light-source array or a two-dimensional point-light-source array can be taken as the active-eyebox generating device 20. For example, in FIG. 12, with light from line-light-source $LS_6$ as backlight, beams emitted from display-cell block $B_{11}$ will cover a real relay-eyebox. Then, with similar design rule, real relay-eyeboxes can get projected. Under this condition, $\Delta > N_b \times D_s$.

Similar to FIG. 13A and FIG. 13B, rectangular zones or strip-shaped zones can also get generated by unidirectional scattering sheet 90, on the plane of the relay-eyeboxes or one the plane of the active-eyeboxes.

All focal-length-related optical components (optical element or optical device) discussed above, can be configured being sensitive to light characteristics. Said "sensitive" refers to that the optical component has different focal lengths to light of different characteristics. In this case, the orthogonal characteristics discussed above, or new characteristics, can be taken as the sensitive characteristics. Then, display cells emitting light of different sensitive characteristics may be projected to different depth positions. Or, endow different sensitive characteristics to all the display cells at different time-points of a time period. Thus the display screen 10 may be projected to different depth positions at different time-points of a time period. For example, when the lenticular lenses of a one-dimensional lenticular grating (as an eyebox-generating device), or lenses of two-dimensional lens grating (as an eyebox-generating device), or projecting unit 50, are implemented by metasurfcce structures, they can be configured to have different focal lengths to light of different polarization states. The projecting unit 50 can also be driven by the control unit 30 to present different focal lengths. For example, a liquid crystal lens can be used as the projecting unit 50, to project the display screen 10 to different depths under different driving voltages. The different focal lengths of an optical component may appear sequentially, or an adaptive focal length is activated for guaranteeing that to-be-displayed scenes are around the gazing depth. In the above embodiments, O≥2 orthogonal characteristics can also be endowed to adjacent O light-guiding elements, respectively. Light-guiding elements of same orthogonal characteristics form a light-guiding element cluster. There will exist O light-guiding element clusters. The display cells of display screen 10 are grouped into O display-cell clusters, correspondingly. The O display-cell clusters correspond to the O light-guiding element clusters in a one-to-one manner. A display-cell cluster is configured to only project light of the orthogonal characteristic same to corresponding light-guiding element cluster. Thus, a light-guiding element cluster only allows light from corresponding display-cell cluster passing through, blocking the light from non-corresponding display-cell clusters. Or a display-cell cluster only allows light from corresponding light-guiding element cluster passing through, blocking the light from non-corresponding light-guiding element clusters. A display-cell cluster and corresponding light-guiding element cluster construct up a sub-display system. Then, the O sub-display systems can implement active-eyebox projecting independently, as discussed above. Said orthogonal characteristics in present disclosure mean the characteristics which can identify each other. For example, light-guiding elements of a cluster should only let light of corresponding characteristics passing through. That is to say, light-guiding elements of a cluster should only let light from corresponding display-cell cluster passing through. Or, display-cells of a cluster should only let light of corresponding characteristics passing through. That is to say, display-cells of a cluster should only let light from corresponding light-guiding element cluster passing through. Similar to above discussed orthogonal characteristics of the sub-apertures, said orthogonal characteristics include, but not limited to, temporal orthogonal characteristics, color orthogonal characteristics, polarization orthogonal characteristics. Among them, the temporal orthogonal characteristics of the light-guiding element clusters can be implemented by attaching a controllable aperture to each light-guiding element, such as a liquid-crystal aperture. The light-guiding elements of different clusters are turned on at different time-points of each time period, respectively. Under this condition, different light-guiding element clusters correspond to all the display cells, but the display cells corresponding to different light-guiding element clusters are activated at different time-points.

Color orthogonal characteristics are exampled here when a conventional RGB display screen 10 is employed. Three sub-pixels, which emit R, G, B lights respectively, are tiled as a pixel. Different sub-pixels of a pixel locate at different positions on the display screen 10, functioning as different display cells of different colors (R, G, or B). O=3 light-guiding element clusters are configured to only allow R, G, and B lights passing through, respectively, by attaching corresponding color filter to each light-guiding element. Thus, R display cells and light-guiding elements allowing R light passing through constitute a sub-display system of R characteristic, G display cells and light-guiding elements allowing G light passing through constitute a sub-display system of G characteristic, B display cells and light-guiding elements allowing B light passing through constitute a sub-display system of B characteristic. They implement eyeboxes projecting, respectively. Obviously, display screen 10 with sub-pixels of more kinds of colors will leads to more sub-display systems.

The polarization orthogonal characteristics can get implemented by attaching corresponding polarizer to each light-guiding element. Or, the light-guiding element is a metasurface element, which is configured to allow only corresponding polarized light passing through. For example, O=2 adjacent light-guiding elements allow left polarized light and right polarized light passing through, respectively. The display cells 10 are divided into two display-cell clusters, which are respectively configured to emit left polarized light and right polarized light. Thus, two sub-display systems get formed. The polarization orthogonality characteristic can also take two linear polarization states, with two polarization direction perpendicular to each other.

The display cell may be a structure emitting color light, such as a stacked structure consisting of R light emitting layer, G light emitting layer, and B light emitting layer, or an aperture with R, G, B lights incoming sequentially as backlight. Under this condition, when color orthogonal characteristics are endowed to the light-guiding elements, the R light, G light, and B light from a same display cell will pass through different light-guiding elements, respectively. Thus, a display cell will correspond to multiple projecting paths and multiple display-cell viewpoints in this case.

The strip-shaped zone and rectangular zone shown in FIG. 13A and FIG. 13B may also get implemented in the display system shown in FIG. 14.

Above-mentioned designs of orthogonal characteristics, directional backlights, sub-apertures, unidirectional scattering sheet, and tunable eyebox-generating device, are all applicable to the case of n=0. These designs benefit increasing the display resolution or/and the viewpoint number.

Figure 16:
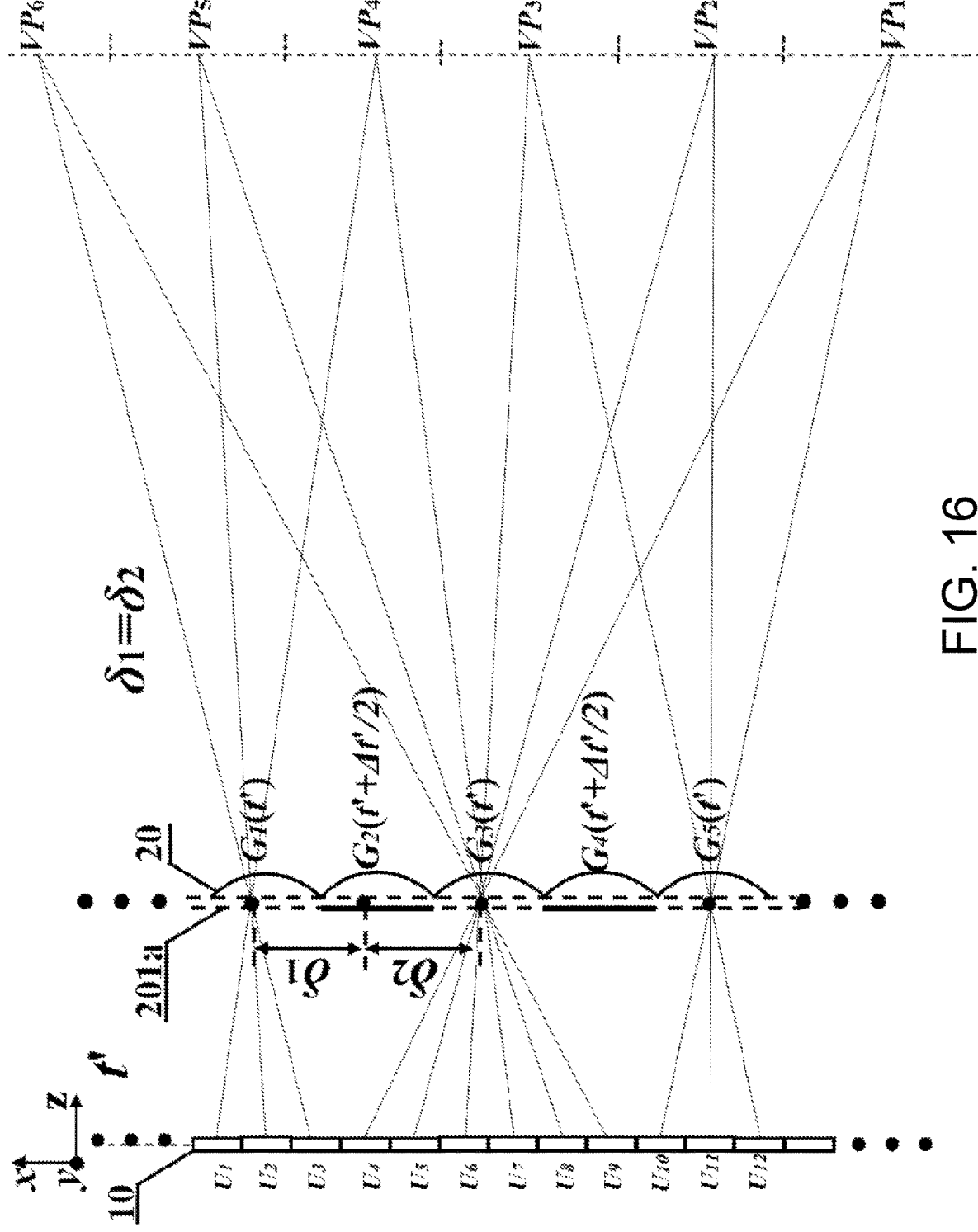
FIG. 16 is a display structure whose light-guiding elements have temporal orthogonal characteristics.

FIG. 16 shows an example when adjacent O=2 light-guiding elements are endowed with temporal orthogonality characteristics. For simplicity, FIG. 16 takes n=0. When n=0, the eyeboxes appear seamlessly, leading to a continuous observing region. According to the optical design explained above, it can be easily extended to the case of n>0.

Figure 17:
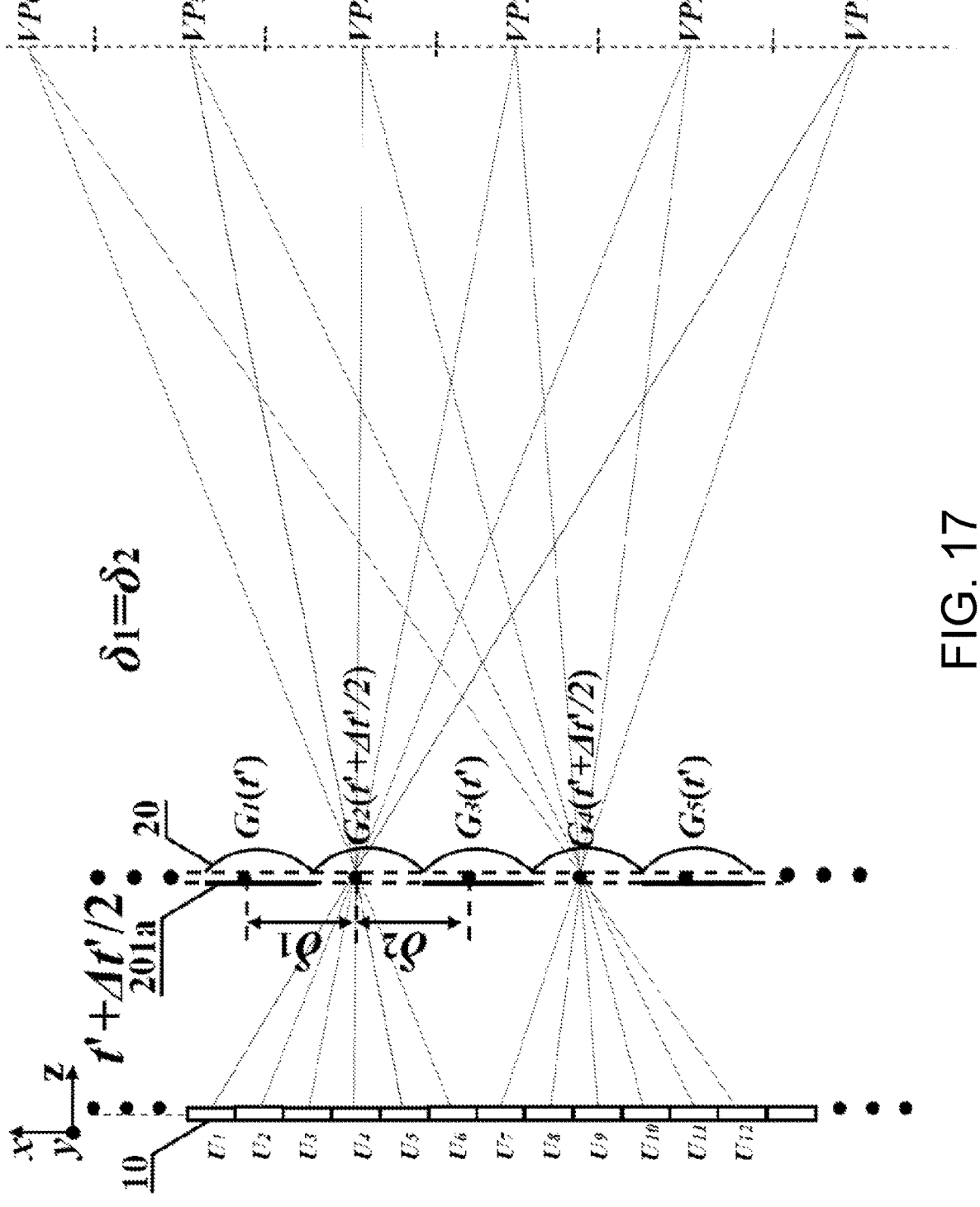
FIG. 17 is another state of the light-guiding elements with temporal orthogonal characteristics.

$U_1$, $U_2$, $U_3$, $U_4$ . . . refer to the display cells. Under the case of n=0, eyeboxes appear seamlessly, so the generated eyeboxes will no longer be marked. The light-guiding element of a display system with n=0 is marked by "G+subscript". Here, the situation that the observing region is constructed by view viewpoints is taken. The light-guiding elements of the eyebox-generating device 20 are grouped into O=2 light-guiding element clusters, with the light-guiding elements of a cluster being spaced by (O−1)=1 light-guiding element. The O=2 light-guiding element clusters are activated at two time-points t' and t'+Δt/2 of a time period t'~t'+Δ', respectively. The activation of a light-guiding element cluster can be implemented, for example, by a controllable aperture array 201a. The controllable aperture array 201a is composed of apertures, and these apertures correspond to the light-guiding elements in a one-to-one manner. Under the control of the control unit 30, the controllable aperture array 201a only turns on the apertures corresponding to a light-guiding element cluster at a time-point. And different light-guiding element clusters can be activated sequentially in each time period. Under this condition, the display cells function as O=2 display-cell clusters, at O=2 time-points of each time period. That is to say, display-cell clusters corresponding to different light-guiding element clusters consist of same display cells, but play functions at different time-points of each time period. In FIG. 16, at time-point t', the light-guiding element cluster, consisting of light-guiding element $G_1$, $G_3$, $G_5$ . . . , is activated. The light-guiding elements $G_2$, $G_4$, $G_6$ . . . , are blocked by corresponding apertures of the controllable aperture array 201a. At this time-point, all display cells are grouped together as a display-cell cluster corresponding to the light-guiding element cluster of $G_1$, $G_3$, $G_5$ . . . . With a one-dimensional lenticular grating as the eyebox-generating device 20, view viewpoints $VP_1$, $VP_2$, $VP_3$, $VP_4$, $VP_5$, and $VP_6$ get generated. Then, at time-point t'+Δt'/2 shown in FIG. 17, the other light-guiding element cluster, consisting of light-guiding elements $G_2$, $G_4$, $G_6$ . . . , is activated. The light-guiding elements $G_1$, $G_3$, $G_5$ . . . , are blocked by corresponding apertures of the controllable aperture array 201a. At this time-point, all display cells are grouped together as a display-cell cluster corresponding to the light-guiding element cluster of $G_2$, $G_4$, $G_6$ . . . . Under the condition of $\delta_1=\delta_2$, projected view viewpoints at the time-point t'+Δt'/2 overlaps with the view viewpoints $VP_1$, $VP_2$, $VP_3$, $VP_4$, $VP_5$, and $VP_6$ respectively, as shown in FIG. 17. Under this condition, the resolution of the perspective view corresponding to an overlapped view viewpoint gets doubled. Here, $\delta_1$, $\delta_2$ are the intervals between a light-guiding element of a cluster and adjacent two light-guiding elements of the other clusters, respectively.

$\delta_1\neq\delta_2$ is also another optional configuration, as shown in FIG. 18 and FIG. 19. Under this condition, the view viewpoints from different light-guiding element clusters may have some position offsets. FIG. 18 shows the view viewpoints $VP_1$, $VP_2$, $VP_3$, $VP_4$, $VP_5$, and $VP_6$ from light-guiding element cluster of $G_1$, $G_3$, $G_5$ . . . at the time-point t'. FIG. 18 shows the view viewpoints $VP'_1$, $VP'_2$, $VP'_3$, $VP'_4$, $VP'_5$, and $VP'_6$ from light-guiding element cluster of $G_2$, $G_4$, $G_6$ . . . at the time-point t'+Δt'/2. Under this condition, the number of generated view viewpoints gets doubled. In FIGS. 18 and 19, the interval between adjacent light-guiding elements of a same cluster is configured with an equal value. The intervals between adjacent light-guiding elements of a same cluster can also be set different.

FIG. 20 shows an eyebox-generating device 20 with polarization orthogonal characteristics. The light-guiding elements spaced by (O−1)=1 light-guiding element are grouped into a light-guiding element cluster. The O=2 light-guiding element clusters are endowed with O=2 polarization orthogonal characteristics. The O=2 polarization orthogonal characteristics can be two linear polarized states with polarization directions perpendicular to each other, or left polarized state and right polarized state. The O=2 polarization orthogonal characteristics are dented as "•" and "↕" in FIG. 20. As shown in FIG. 20, the O=2 light-guiding element clusters allow only "•" and "↕" light passing through, respectively. Concretely, a light-guiding element cluster of $G_1$, $G_3$, $G_5$ . . . allows only "•" light passing through. The light-guiding element cluster of $G_2$, $G_4$, $G_6$ . . . allows only "↕" light passing through. Said "allow only "•" or "↕" light passing through" may get implemented by possible methods. Such as attaching a special polarizer of a polarizing film array 201b to each light-guiding element, or a light-guiding element itself being a Meta-surface which can allow only "•" or only "↕" light passing through by different structure-based design. Correspondingly, as shown in FIG. 20, the display cells are grouped into two display-cell clusters, projecting "•" light and "↕" light respectively. Thus, the display cells and light-guiding elements with "•" characteristics are taken as a sub-display system, the display cells and light-guiding elements with "↕" characteristics are taken as another sub-display system. They operate independently. Similarly to FIGS. 16~19, FIG. 20 may take $\delta_1=\delta_2$ or $\delta_1\neq\delta_2$. Another configuration is that the light from all the display cells can appear as "•" light or "↕" light sequentially, under the control of a polarization modulating film 101b. For example, an electrically controlled polarizer can be taken as the polarization modulating film 101b. As shown in FIG. 21, at different voltages from the control unit 30, the polarization modulating film 101b will make the emitting light to be "•" light or "↕" light, respectively. The polarization modulating film 101b works together with the polarizing film array 201b. FIG. 22 shows an eyebox-generating device 20 of color orthogonal characteristics, with a conventional RGB display screen. The light-guiding elements are grouped into O=3 light-guiding element clusters, allowing R, G, and B lights passing through, respectively. The color orthogonality characteristic of the eyebox-generating device 20 can be implemented by attaching a corresponding color filter to each light-guiding element. These color filters are denoted as a filter array 201c. Thus, the display cells and light-guiding elements of a same color are taken as a sub-display system. Totally O=3 sub-display systems exist. The intervals between adjacent light-guiding elements of different colors, denoted as $\delta_{RG}$, $\delta_{GB}$, and $\delta_{BR}$ in FIG. 22, may take an equivalent value, or unequal values.

FIG. 23 shows a tunable eyebox-generating device 20. Here, as an example, the position of each light-guiding element is adjustable under control of the control unit 30. The light-guiding element takes a lenticular lens as example. For clarity of illustration, only two light-guiding elements k, k+1 are shown, with optical centers denoted as $O_k$ and $O_{k+1}$, respectively. Through the light-guiding elements k, light from corresponding display cells $U_1$, $U_2$, $U_3$, $U_4$, $U_5$, $U_6$, $U_7$, $U_8$, $U_9$ are guided to the viewpoints $VP_1$, $VP_2$, $VP_3$, $VP_4$, $VP_5$, $VP_6$, $VP_7$, $VP_8$, $VZ_9$, respectively. Under the control of the control unit 30, the optical center of each light-guiding element gets shifted. For example, the optical centers $O_k$ is shifted to the point $O'_k$ or $O''_k$. Under these conditions, the generated viewpoints will take some location displacements correspondingly. Concretely, shifting the light-guiding element k from the point $O_k$ to the point $O'_k$, the viewpoint corresponding to the display cell $U_1$ will move to the viewpoint $VP'_1$ from the viewpoint $VP_1$. Shifting the light-guiding element k from the point $O_k$ to the point $O''_k$, the viewpoint corresponding to the display cell $U_6$ will move to the viewpoint $VP_1$ from the viewpoint $VP_6$.

Obviously, the designs shown in FIGS. 16-23 are applicable to the display structures shown in Embodiment 1.

In FIG. 5A and FIG. 5B, the display screen 10 is located at an object distance smaller than the focal length f of the projecting unit 50. Actually, the display screen 10 can also be projected as a real image, such as in the case of floating display. FIGS. 24~26 show the real images of the display screen. In FIG. 24, the relay-eyebox has a positive object distance $+u''_e > f$ and a real image presents in the active-eyebox. In FIG. 25, the relay-eyebox has a positive object distance $+u''_e < f$ and a virtual image presents in the active-eyebox. In FIG. 26, the relay-active eyebox has a negative object distance $-u''_e$ and a real image presents in the active-eyebox. Actually, the object distance of the relay-eyeboxes and the image distance of the active-eyeboxes can take any possible combination, such as a positive object distance of the relay-eyeboxes+a positive image distance of the active-eyeboxes, or a positive object distance of the relay-eyeboxes+a negative image distance of the active-eyeboxes, or a negative object distance of the relay-eyeboxes+a positive image distance of the active-eyeboxes, or a negative object distance of the relay-eyeboxes+a negative image distance of the active-eyeboxes. This is also applicable to the case when the display screen 10 is projected as a virtual image and/or virtual relay-eyeboxes are generated.

When the displayed scene locates before the active-eyeboxes along the propagating direction of the light, the observing region will be no longer around the active-eyeboxes. Under this condition, the observing region is the overlapping region of beams from all the displayed points, as shown in FIG. 27. In present disclosure, the projected scene from the display screen 10 by the eyebox-generating device 20 may cover a depth range around the focal plane of the projecting unit 30. Said "projected scene from the display screen 10 by the eyebox-generating device 20" is imaged as the displayed scene by the projecting unit 30. In this case, a part of the displayed scene will be a real image, and the other part of the displayed scene will be a virtual image.

A transmissive lens is often taken as the projecting unit 50. It may be a reflective lens, as shown in FIG. 28A and FIG. 28B. To guide light from the projecting unit 50 to the viewer without destructive affection from the eyebox-generating device 20, an auxiliary device is needed. The auxiliary device 501 shown in FIG. 28A can adjust the first state of the incident light to the second state when it leaves the auxiliary device 501. Under this condition, the eyebox-generating device 20 is configured to impose no modulation to the light of the second state, and the display screen 10 should be a transparent screen. For example, the auxiliary device 501 is a ½ phase plate, and said first state and second state refer to two linear polarization states, with two polarization directions perpendicular to each other. The eyebox-generating device 20 is a Meta-surface being nonreactive to the light in the second state, or guiding the light in the second state to miss the relay-eyeboxes. Or the eyebox-generating device 20 is a liquid crystal device being nonreactive to the light in the second state. The auxiliary device exampled in FIG. 28B is a deflection device 502, which can guide light from the projecting unit 50 to miss the eyebox-generating device 20 and the display screen 10.

In the above embodiments, the display screen 10 and the corresponding eyebox-generating device 20 are shown as planar devices, which can also be curved devices. In this case, the intervals between adjacent light-guiding elements may be non-uniform, to guide beam of each display cell to corresponding relay-eyebox. Various display screens, including backlit- and emissive-screens, can be used as said display screens 10, such as LCD screen, LED screen, OLED screen, LBS (MEMS), etc.

The difference between above two embodiments lies in the real relay-eyebox and virtual relay-eye-box. Proposed methods and ideas in these two embodiments can be borrowed from each other. At the same time, the orthogonal characteristics have been exampled by some specific characteristics, but they cannot be listed exhaustively.

It should be understood that above embodiments are merely embodiments adopt to explain the principles of the present disclosure, and the present disclosure is not limited thereto. It will be apparent to one or ordinary skill in the art that various changes and modifications may be made therein without departing from the spirit and scope of the present disclosure, and such changes and modifications also fall within the scope of the present disclosure. The above are only preferred embodiments of present disclosure, but the design concept of present disclosure is not limited to them. At the same time, the orthogonal characteristics can not be listed exhaustively. Correspondingly, all relevant embodiments fall within the scope of protection of present disclosure.

What is claimed is:

1. A dense-viewpoint three-dimensional display system comprising:

a display screen comprising a plurality of display cells for projecting light to two pupils of a viewer, wherein all the display cells are divided into multiple display-cell blocks along at least one direction;

wherein, each of the display cells is a smallest surface structure which is capable of emitting light independently;

an eyebox-generating device comprising a plurality of light-guiding elements arranged along at least one direction, wherein each of the light-guiding elements is used for guiding beams or reverse extension lines of the beams from $N_b$ corresponding display-cell blocks to $N_b$ relay-eyeboxes in a one-to-one manner, $N_b$ is an integer and $N_b \geq 2$;

wherein, for any one of the light-guiding elements, the $N_b$ display-cell blocks corresponding to the light-guiding element are spaced by $n \times N_b$ display-cell blocks along at least one direction, n is an integer and $n \geq 0$;

a projecting unit capable of imaging said $N_b$ relay-eyeboxes to $N_b$ active-eyeboxes, respectively;

a control unit capable of refreshing each of the display cells with projection information of a to-be-displayed scene along a projecting path corresponding to one of the display cells;

wherein, the projecting path corresponding to the one of the display cells is the propagation path of the beam which comes from one of the display cells and incidents into corresponding relay-eyebox, or corresponding active-eyebox, and the different display cells correspond to the different projecting paths;

a tracking unit capable of detecting positions of the viewer's pupils under control of said control unit;

wherein, said dense-viewpoint three-dimensional display system is configured such that, along at least one direction, the beams from display-cell blocks spaced by $(N_b-1)$ display-cell blocks are guided to a same relay-eyebox at a time-point;

and, for a displayed point, one of the two pupils of the viewer in the relay-eyebox or the active-eyebox can perceive more than one beams passing through the displayed point when all the display cells are activated.

2. The dense-viewpoint three-dimensional display system according to claim 1, characterized in that, the eyebox-generating device is a one-dimensional lenticular grating comprising a plurality of lenticular lens functioning as the light-guiding elements, or a one-dimensional slit grating comprising a plurality of slits functioning as light-guiding elements, or a two-dimensional lens grating comprising a plurality of lenticular lens functioning as the light-guiding elements, or a two-dimensional aperture grating comprising a plurality of apertures functioning as the light-guiding elements, or a two-dimensional micro-nano component array comprising a plurality of micro-nano components corresponding to said display cells in a one-to-one manner, or a one-dimensional line-light-source array comprising a plurality of line-light-sources functioning as the light-guiding elements, or a two-dimensional point-light-source array comprising a plurality of point-light-sources functioning as the light-guiding elements;

wherein, the micro-nano components guide the beams from the corresponding display cells to the corresponding relay-eyebox, or, the display cells emit the beams propagating to the corresponding relay-eyebox with light from corresponding line-light-source or point-light-source as directional backlight.

3. The dense-viewpoint three-dimensional display system according to claim 1, characterized in that, said eyebox-generating device is a tunable device, with function parameters being adjustable by the control unit;

wherein, said function parameters are positions of said light-guiding elements, or/and intervals between said light-guiding elements, or/and focal lengths of said light-guiding elements, or/and arrangement directions of said light-guiding elements.

4. The dense-viewpoint three-dimensional display system according to claim 3, characterized in that, the control unit is capable of controlling said eyebox-generating device to present different function parameters sequentially at different time-points of a time period;

or, the control unit is capable of controlling said eyebox-generating device to present an adaptive function parameter according to real-time positions of the two pupils of the viewer, to make generated relay-eyeboxes or active-eyeboxes keep tracking the two pupils;

or, the control unit is capable of inactivating said eyebox-generating device's function of generating relay-eyeboxes, for implementing two-dimensional display.

5. The dense-viewpoint three-dimensional display system according to claim 1, characterized in that, said display cell is a sub-pixel emitting monochromatic light, or a stacked structure of multiple luminous units, or an aperture with backlights of different colors incoming sequentially.

6. The dense-viewpoint three-dimensional display system according to claim 1, characterized in that, said display screen is attached with a divergence-angle-adjusting device, for decreasing divergence angle of the beam from the display cell.

7. The dense-viewpoint three-dimensional display system according to claim 1, characterized in that, the eyebox-generating device comprising at least O light-guiding elements, adjacent O light-guiding elements are endowed with O kinds of orthogonal characteristics, respectively, wherein O is an integer and $O \geq 2$;

wherein, the light-guiding element only allows light of corresponding orthogonal characteristic outgoing, and said display cells is capable of emitting light of said O kinds of orthogonal characteristics, respectively;

light-guiding elements and display cells of a same orthogonal characteristic constitute a sub-display system, and, the sub-display systems project relay-eyeboxes independently.

8. The dense-viewpoint three-dimensional display system according to claim 7, characterized in that, said light-guiding elements of different orthogonal characteristics have different function parameters;

wherein, said function parameters refer to a distance between each of the light-guiding elements and said display screen, or/and focal lengths of said light-guiding elements, or/and intervals between said light-guiding elements.

9. The dense-viewpoint three-dimensional display system according to claim 1, characterized in that, said display screen has a backlight structure, providing different directional backlights at T time-points of a time period, with said display screen getting refreshed synchronously, wherein $T \geq 2$.

10. The dense-viewpoint three-dimensional display system according to claim 1, characterized in that, the dense-viewpoint three-dimensional display system further comprising an aperture array consisting of apertures;

wherein, the aperture is attached to the light-guiding element, for adjusting clear aperture size of the light-guiding element.

11. The dense-viewpoint three-dimensional display system according to claim 10, characterized in that, the aperture includes S sub-apertures;

wherein, said S sub-apertures of the aperture allow light of S kinds of orthogonal characteristics passing through, respectively, S is a positive integer and $S \geq 2$;

and, said display cells are grouped into S display-cell groups, emitting light of said S kinds of orthogonal characteristics respectively.

12. The dense-viewpoint three-dimensional display system according to claim 2, characterized in that, the line-light-source or the point-light-source includes S sub-line-light-sources or S sub-point-light-sources projecting light of S kinds of orthogonal characteristic, respectively, S is a positive integer and $S \geq 2$;

wherein, said display cells are grouped into S display-cell groups projecting light of said S kinds of orthogonal characteristic, respectively.

13. The dense-viewpoint three-dimensional display system according to claim 1, characterized in that, said projecting unit is composed of at least one refractive component, or/and at least one reflective component, or/and at least one diffractive component.

14. The dense-viewpoint three-dimensional display system according to claim 1, characterized in that said projecting unit have different focal lengths for different orthogonal characteristic light, or/and said projecting unit have different focal lengths under control of said controlling unit.

15. The dense-viewpoint three-dimensional display system according to claim 1, characterized in that, a unidirectional scattering sheet is attached to a composite structure constructed by said display screen and eyebox-generating device, to scatter the beam from the display cell such that the beam has a rectangular light distribution or a strip-shaped light distribution in corresponding relay-eyebox.

16. The dense-viewpoint three-dimensional display system according to claim 1, characterized in that, said projecting unit is a transmissive device, or a reflective device.

17. The dense-viewpoint three-dimensional display system according to claim 16, characterized in that, the dense-viewpoint three-dimensional display system is provided with an auxiliary device for guiding light from said projecting unit to a viewer to reduce affection from said eyebox-generating device.

18. A display method based on the dense-viewpoint three-dimensional display system according to claim 1, characterized in that, the display method comprises following steps:

(i) according to a pre-set position for a viewer, determining the display cells corresponding to each light-guiding element, to make generated relay-eyeboxes or active-eyeboxes cover the two pupils of the viewer at said pre-set position;

(ii) refreshing said display screen under control of said control unit;

(iii) detecting real-time positions of the two pupils of the viewer by tracking unit at a time-point, (iv) according to positions of the viewer's pupils detected in the step (iii), re-determining display cells corresponding to each light-guiding element, or/and adjusting function parameter(s) of said eyebox-generating device, or/and activating backlight along an adaptive direction, to guarantee tracking of generated relay-eyeboxes or generated active-eyeboxes to the viewer's pupils;

(v) refreshing said display screen synchronously; and (vi) repeating steps (iii) to (v).

\* \* \* \* \*